(12) United States Patent
Choudhury et al.

(10) Patent No.: US 8,619,687 B2
(45) Date of Patent: Dec. 31, 2013

(54) COORDINATING UPLINK RESOURCE ALLOCATION

(75) Inventors: Sayantan Choudhury, Vancouver, WA (US); Ahmad Khoshnevis, Portland, OR (US); Kimihiko Imamura, Vancouver, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 779 days.

(21) Appl. No.: 12/705,012

(22) Filed: Feb. 12, 2010

(65) Prior Publication Data

US 2011/0201341 A1    Aug. 18, 2011

(51) Int. Cl.
*H04W 74/00*    (2009.01)

(52) U.S. Cl.
USPC ........... 370/329; 370/341; 370/437; 455/450; 455/509

(58) Field of Classification Search
None
See application file for complete search history.

(56) References Cited

U.S. PATENT DOCUMENTS

| | | | |
|---|---|---|---|
| 7,424,296 B2 | 9/2008 | Schwarz et al. | |
| 7,558,577 B2 | 7/2009 | Dillon et al. | |
| 7,596,080 B2 | 9/2009 | Gerlach | |
| 7,627,048 B2 | 12/2009 | Larsson | |
| 2002/0082021 A1 | 6/2002 | Chen et al. | |
| 2005/0232195 A1 | 10/2005 | Jones | |
| 2007/0004423 A1* | 1/2007 | Gerlach et al. | 455/452.2 |
| 2007/0207812 A1 | 9/2007 | Borran et al. | |
| 2007/0218954 A1 | 9/2007 | Garrett et al. | |
| 2008/0089286 A1* | 4/2008 | Malladi et al. | 370/330 |
| 2008/0268859 A1* | 10/2008 | Lee et al. | 455/450 |
| 2009/0129331 A1* | 5/2009 | Wu et al. | 370/330 |
| 2009/0180406 A1 | 7/2009 | Breuer et al. | |
| 2009/0196249 A1* | 8/2009 | Kawamura et al. | 370/330 |
| 2009/0316675 A1* | 12/2009 | Malladi et al. | 370/343 |
| 2010/0027483 A1* | 2/2010 | Ofuji et al. | 370/329 |
| 2010/0144356 A1* | 6/2010 | Li et al. | 455/446 |
| 2011/0085513 A1* | 4/2011 | Chen et al. | 370/330 |
| 2011/0098054 A1* | 4/2011 | Gorokhov et al. | 455/452.1 |
| 2011/0267959 A1* | 11/2011 | Yi et al. | 370/241 |
| 2012/0008511 A1* | 1/2012 | Fan et al. | 370/252 |
| 2012/0021753 A1* | 1/2012 | Damnjanovic et al. | 455/450 |
| 2012/0147836 A1* | 6/2012 | Ishii et al. | 370/329 |
| 2012/0236816 A1* | 9/2012 | Park et al. | 370/329 |

FOREIGN PATENT DOCUMENTS

| | | |
|---|---|---|
| GB | 2 412 036 | 9/2005 |
| JP | 2002-199435 | 7/2002 |
| JP | 2009-522958 | 6/2009 |

(Continued)

OTHER PUBLICATIONS

International Search Report issued for International Patent Application No. PCT/JP2011/051839 on Apr. 12, 2011.

(Continued)

*Primary Examiner* — Hassan Phillips
*Assistant Examiner* — Duc Duong
(74) *Attorney, Agent, or Firm* — Austin Rapp & Hardman

(57) ABSTRACT

A base station configured for coordinating uplink resource allocation is described. The base station includes a processor and instructions stored in memory. The base station generates uplink resource allocation information for one or more wireless communication devices. The uplink resource allocation information is sent to one or more base stations. The base station allocates uplink resources based on the uplink resource allocation information. The base station sends an assignment to one or more wireless communication devices based on the uplink resource allocation information.

42 Claims, 15 Drawing Sheets

(56) References Cited

FOREIGN PATENT DOCUMENTS

| JP | 2009-147499 | 7/2009 |
|----|-------------|--------|
| WO | 2007/042532 | 4/2007 |
| WO | 2007/112143 | 10/2007 |

OTHER PUBLICATIONS

3GPP TS 36.213 V8.6.0, "Evolved Universal Terrestrial Radio Access (E-UTRA) Physical layer procedures," Mar. 2009.

3GPP TS 36.300 V8.1.0, "Evolved Universal Terrestrial Radio Access (E-UTRA) and Evolved Universal Terrestrial Radio Access Network (E-UTRAN); Overall description," Jun. 2007.

3GPP TS 36.211 V8.6.0, "Evolved Universal Terrestrial Radio Access (E-UTRA) Physical Channels and Modulation," Mar. 2009.

3GPP TS 36.321 V9.1.0, "Evolved Universal Terrestrial Radio Access (E-UTRA) Medium Access Control (MAC) protocol specification," Dec. 2009.

3GPP TS 36.331 V9.1.0, "Evolved Universal Terrestrial Radio Access (E-UTRA) Radio Resource Control (RRC); Protocol specification," Mar. 2009.

3GPP TR 36.913 V9.0.0, "Requirements for Further Advancements for Evolved Universal Terrestrial Radio Access (E-UTRA) (LTE-Advanced)," Mar. 2009.

3GPP TR 36.814 V1.5.0, "Further Advancements for E-UTRA Physical Layer Aspects," Mar. 2009.

* cited by examiner

COORDINATING UPLINK RESOURCE ALLOCATION

TECHNICAL FIELD

The present disclosure relates generally to wireless communication systems. More specifically, the present disclosure relates to coordinating uplink resource allocation.

BACKGROUND

Wireless communication systems have become an important means by which many people worldwide have come to communicate. A wireless communication system may provide communication for a number of wireless communication devices, each of which may be serviced by a base station.

A wireless communication device, such as a cellular phone, may be used for voice and/or data communication over a wireless communication system. A base station is a fixed station (e.g., a wireless communication station that is installed at a fixed location) that communicates with wireless communication devices.

A base station typically corresponds to a cell. A cell is a geographical area where wireless communications may occur between the base station and one or more wireless communication devices. One cell may be adjacent to and even overlap other cells. Wireless communications between wireless communication devices and base stations in neighboring cells may cause interference with wireless communications occurring in a cell. This often occurs when neighboring base stations assign similar communication resources (e.g., frequency bandwidth, time slots, etc.) to wireless communication devices in their respective cells. Such interference may degrade wireless communications, possibly causing errors. As illustrated by this discussion, improved systems and methods for avoiding or reducing interference on a base station may be beneficial.

DETAILED DESCRIPTION

Figure 1:
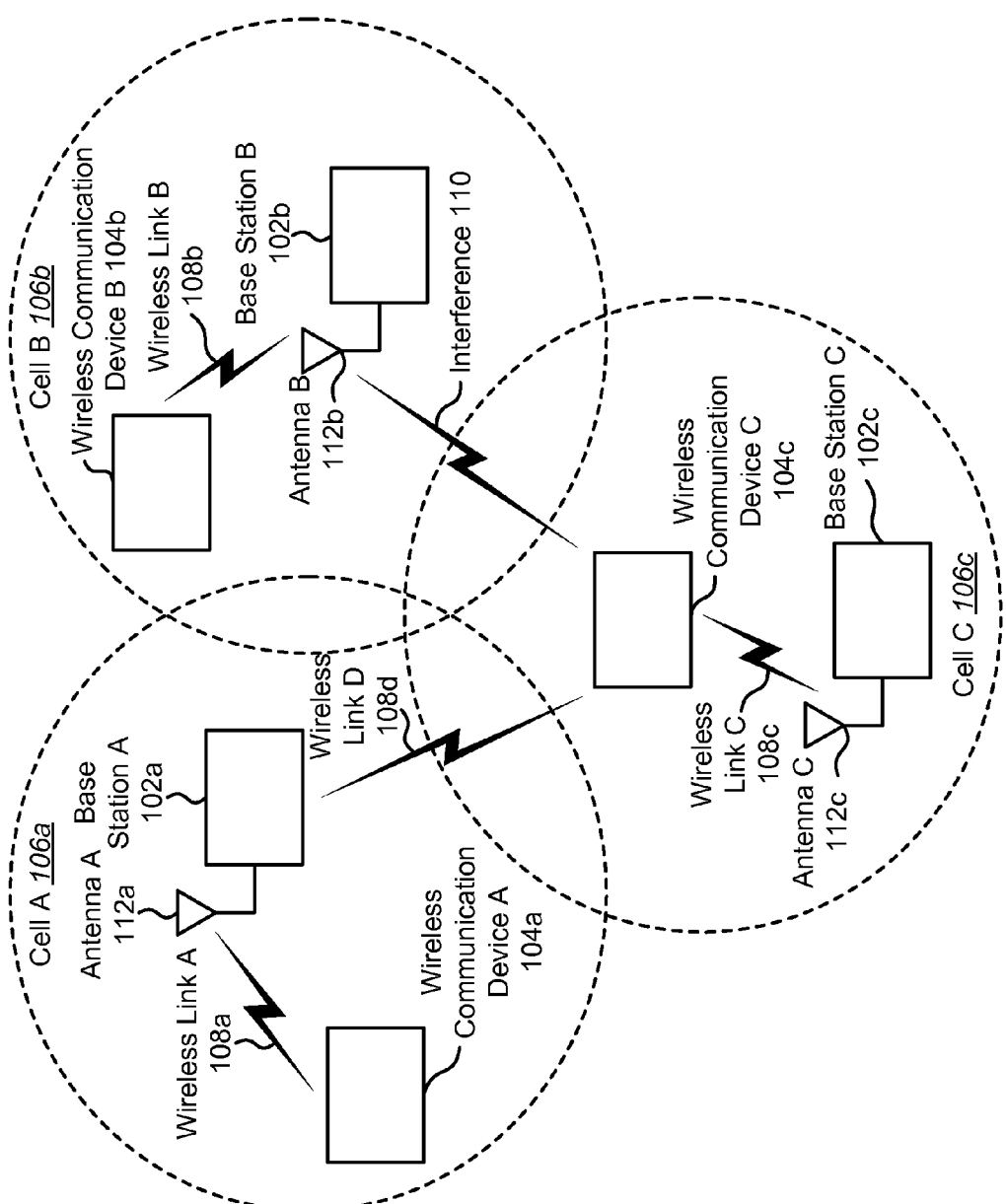
FIG. 1 is a block diagram illustrating one configuration of a system in which systems and methods for coordinating uplink resource allocation may be implemented.

A base station configured for coordinating uplink resource allocation is described. The base station includes a processor and instructions stored in memory. The base station generates uplink resource allocation information for one or more wireless communication devices and sends the uplink resource allocation information to one or more base stations. Uplink resources are allocated based on the uplink resource allocation information and an assignment is sent to one or more wireless communication devices based on the uplink resource allocation information.

The base station may also receive other uplink resource allocation information from another base station. The uplink resources may be allocated further based on the other uplink resource allocation information.

The uplink resource allocation information may be sent to the one or more base stations using a direct wired link, a direct wireless link, a wireless relay, or a backbone network connection. A base station may send the uplink resource allocation information to one or more base stations in order to reduce interference from one or more wireless communication devices. The uplink resource allocation information may be sent in order to allow multiple base stations to decode data sent from a wireless communication device.

The uplink resource allocation information may include information that identifies one or more wireless communication devices, uplink time scheduling information and uplink frequency scheduling information. The uplink resource allocation information may include resource blocks (i.e., which may be mapped using a bitmap mapping) or parameters by which resource blocks may be obtained. In another configuration, the uplink resource allocation information may include a predefined hopping pattern or parameters by which a hopping pattern may be obtained.

A no frequency hopping restriction may be imposed on the one or more wireless communication devices. In one configuration, the uplink resources may be allocated to one or more component carriers.

The uplink resource allocation information may include a starting resource block, a resource indication value, a length in terms of contiguously allocated resource blocks, at least a part of downlink control information (DCI), a frequency-hopping field, a number of physical uplink shared channel (PUSCH) resource blocks, a hopping offset, an uplink bandwidth configuration, a number of sub-bands and hopping mode information.

The uplink resource allocation information may include hopping information or a random access grant. The uplink resource allocation information may include hopping bits, a subframe number and a current number of transmissions of a medium access control (MAC) protocol data unit (PDU). The uplink resource allocation information may include a subframe number, a number of transmissions of a medium access control (MAC) protocol data unit (PDU) and an identification of a serving cell.

A base station configured for coordinating uplink resource allocation is described. The base station includes a processor and instructions stored in memory. The base station receives uplink resource allocation information from one or more base stations and allocates uplink resources based on the uplink resource allocation information. An assignment based on the received uplink resource allocation information is sent to one or more wireless communication devices.

A method for coordinating uplink resource allocation is also described. The method includes generating uplink resource allocation information on a base station for one or more wireless communication devices and sending the uplink resource allocation information to one or more base stations. The method also includes allocating uplink resources on the base station based on the uplink resource allocation information and sending an assignment to one or more wireless communication devices based on the uplink resource allocation information.

A method for coordinating uplink resource allocation is described. The method includes receiving uplink resource allocation information from one or more base stations and allocating uplink resources based on the uplink resource allocation information on a base station. The method further includes sending an assignment based on the received uplink resource allocation information from the base station to one or more wireless communication devices.

The 3rd Generation Partnership Project, also referred to as "3GPP," is a collaboration agreement that aims to define globally applicable technical specifications and technical reports for third and fourth generation wireless communication systems. The 3GPP may define specifications for the next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced standards (Release-8 and Release-10). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a user equipment (UE), an access terminal, a subscriber station, a mobile terminal, a remote station, a user terminal, a terminal, a subscriber unit, a mobile device, etc. A wireless communication device may be a cellular phone, a smartphone, a personal digital assistant (PDA), a netbook, an e-reader, a wireless modem, etc. In 3GPP specifications, a wireless communication device is typically referred to as a user equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved Node B (eNB), a home enhanced or evolved Node B (HeNB), or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point or relay. An access point may be an electronic device that provides access to a network (e.g., Local Area Network (LAN), the Internet, etc.) for wireless communication devices. A relay may be a device that relays (e.g., receives and retransmits) information originating from a base station (e.g., eNB) or wireless communication device (e.g., UE). The term "communication device" may be used to denote either a wireless communication device or a base station.

In 3GPP LTE Release 8, uplink resources for data transmission on the physical uplink shared channel (PUSCH) may be contiguously allocated in order to maintain a single carrier property. While this may help in reducing cubic metric (CM) or peak to average power ratio (PAPR), this may also impose restrictions on the scheduling of resources and may also reduce frequency diversity gain. In order to obtain frequency diversity on the uplink, an LTE system may support the use of resource hopping whereby the resources can "hop" both on an intra- and/or inter-subframe basis. Hopping patterns are done in a cell-specific manner. Hence, adjacent cells are not typically aware of the resource hopping pattern of wireless communication devices belonging to an adjacent cell.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods.

FIG. 1 is a block diagram illustrating one configuration of a system in which systems and methods for coordinating uplink resource allocation may be implemented. Several base stations 102*a-c* may be located such that their corresponding cells 106*a-c* are adjacent to and/or overlap each other. Each base station 102*a-c* may include one or more antennas 112*a-c* that may be used to communicate with one or more wireless communication devices 104*a-c*. For example, wireless communication device A 104*a* communicates with base station A 102*a* using wireless link A 108*a*. Wireless link B 108*b* allows wireless device B 104*b* and base station B 102*b* to communicate. Wireless communication device C 104*c* may communicate with base station C 102*c* using wireless link C 108*c*. In one configuration, wireless communication device C 104*c* may also communicate with base station A 102*a* using wireless link D 108*d*.

As illustrated in FIG. 1, wireless communication device C 104*c* may cause interference 110. For example, the signal sent by wireless communication device C 104*c* to base station C 102*c* using wireless link C 108*c* may be similar to or overlap with the signal sent by wireless communication device B 104*b* to base station B 102*b* using wireless link B 108*b*. More specifically, the frequency bands and/or time slots used on wireless link C 108*c* may be similar to or overlap the frequency bands and/or time slots used on wireless link B 108*b*. Interference 110 may occur as a result, possibly leading to reception errors at base station B 102b. The systems and methods disclosed herein may help to avoid or reduce such interference 110.

Figure 2:
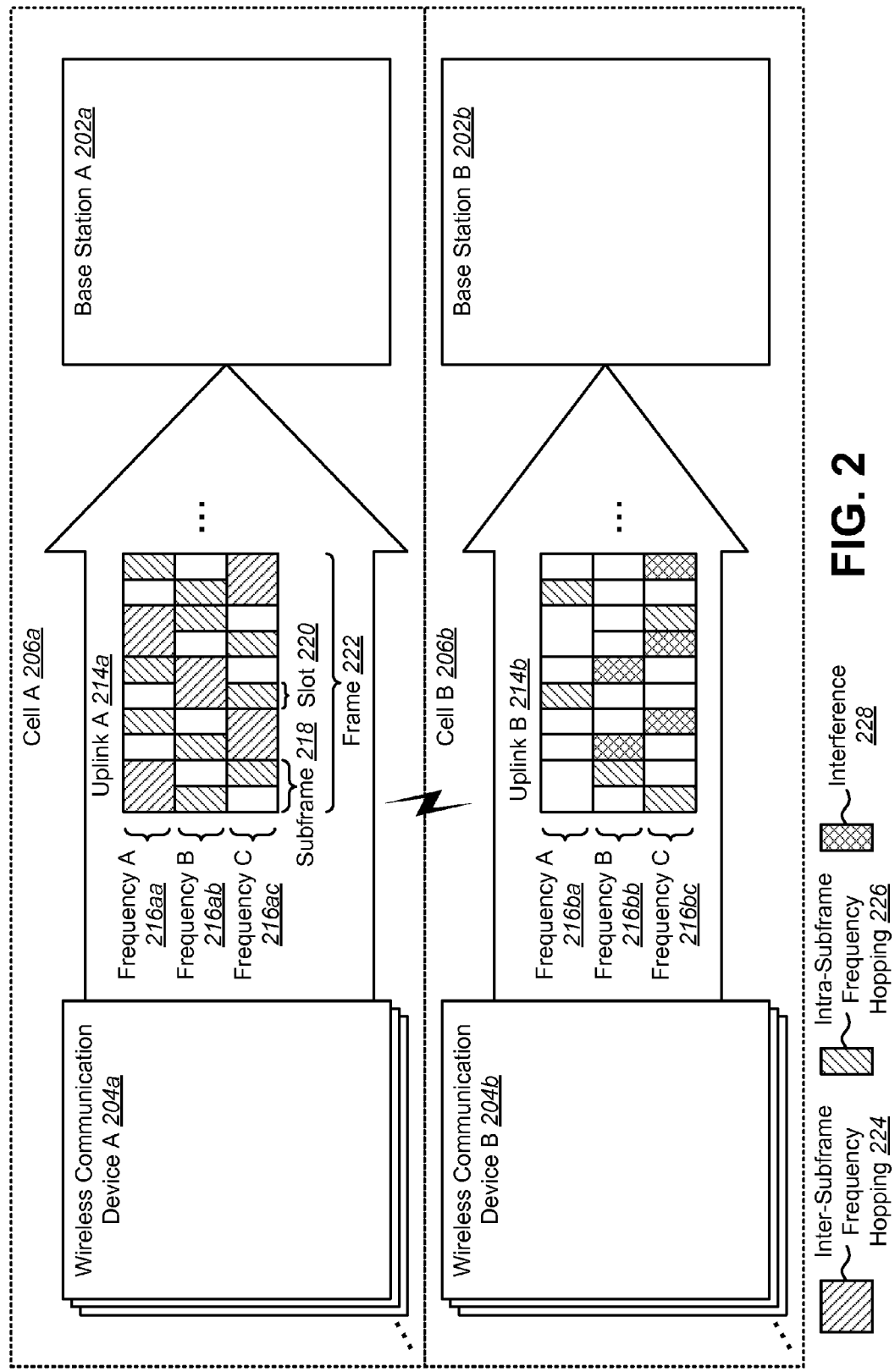
FIG. 2 is a block diagram illustrating one example of interference between two uplinks.

FIG. 2 is a block diagram illustrating one example of interference between two uplinks. In this example, cell A 206a includes base station A 202a and one or more wireless communication devices 204a. In particular, wireless communication device A 204a is illustrated transmitting on data uplink A 214a to base station A 202a. That is, uplink A 214a may be used to transmit information from the one or more wireless communication devices 204a to base station A 202a in cell A 206a. In one configuration, uplink A 214a may be a physical uplink shared channel (PUSCH). Uplink A 214a may be structured using multiple (e.g., "carrier") frequencies 216aa-216ac and frames 222. A frame 222 may be subdivided into subframes 218, which may be further subdivided into slots 220. Slots 220 may include multiple symbols (e.g. orthogonal frequency division multiplex (OFDM) symbols). In this example, only two slots 220 per subframe and five subframes 218 per frame 222 are shown. However, a frame 222 may include any number of subframes 218, and a subframe 218 may include any number of slots 220. In 3GPP LTE, for example, there are 10 subframes 218 per frame 222 and 2 slots 220 per subframe 218. In FIG. 2, only certain frequencies 216 are illustrated. However, an uplink 206 may include any number of (e.g., carrier or sub-carrier) frequencies 216.

The one or more wireless communication devices 204a may employ frequency-hopping. Two kinds of frequency-hopping are illustrated in FIG. 2. Inter-subframe frequency-hopping 224 on uplink A 214a may occur, for example, when wireless communication device A 204a transmits data or information on multiple frequencies 216aa, 216ab, 216ac, changing frequencies 216aa-ac between one or more subframes 218. Furthermore, intra-subframe frequency-hopping 226 on uplink A 214a may occur, for example, when wireless communication device A 204a (e.g., or some other wireless communication device 204a in cell A 206a) transmits data on frequencies 216aa-ac that change within subframes 218.

Cell B 206b may be located adjacent to (e.g., and/or possibly overlap) cell A 206a. Cell B 206b may also include base station B 202b and one or more wireless communication devices 204b. In this example, uplink B 214b is configured similarly to uplink A 214a. More specifically, uplink B 214b may be configured to allow data transmission on frequency (e.g., carrier) A 216ba, frequency B 216bb and frequency C 216bc. Furthermore, the one or more wireless communication devices 204b in cell B 216b may transmit data in similar frames, subframes and slots. It should be noted that in FIGS. 2 and 3, when referring to frequencies (i.e., 216, 316), the first letter following the number indicates the cell and/or uplink that the frequency is utilized in (e.g., cell A 206a, cell B 206b), while the second letter indicates the (e.g., difference in) frequency (e.g., frequency A 216aa to frequency B 216ab). More specifically, the same or similar (e.g., "carrier") frequencies (i.e., 216, 316) may be used in different cells (i.e., 206, 306) on different uplinks (i.e., 214, 314), but may also be considered to be spatially distinct between cells. For example, (e.g., "carrier") frequency A 216aa(e.g., 316aa) may be the same or similar to frequency A 216ba (e.g., 316ba), though transmitted by different wireless communication devices 304a, 304b in different cells 306a, 306b.

When one or more wireless communication devices 204 transmit data on respective uplinks 214 in adjacent cells 206, interference 228 may occur. For example, assume that wireless communication device A 204a is transmitting data on an intra-subframe frequency-hopping 226 basis and another wireless communication device in cell A 206a is transmitting data on an inter-subframe frequency-hopping basis 224 as illustrated on uplink A 214a. Assume also that wireless communication device B 204b is transmitting data on an intra-subframe frequency-hopping 226 basis as illustrated on uplink B 214b. As shown in FIG. 2, when a data transmission overlaps in time (e.g., slots 220, subframes 218 and/or frames 222) and frequency 216, interference 228 may occur. In the example illustrated, several slots 220 of data on uplink A 214a overlap with similar slots of data on uplink B 214b, causing interference 228. When interference 228 occurs in this manner, base station B 202b may have more difficulty in receiving (e.g., and decoding) data sent from wireless communication device B 204b, possibly causing a degradation of received data.

Figure 3:
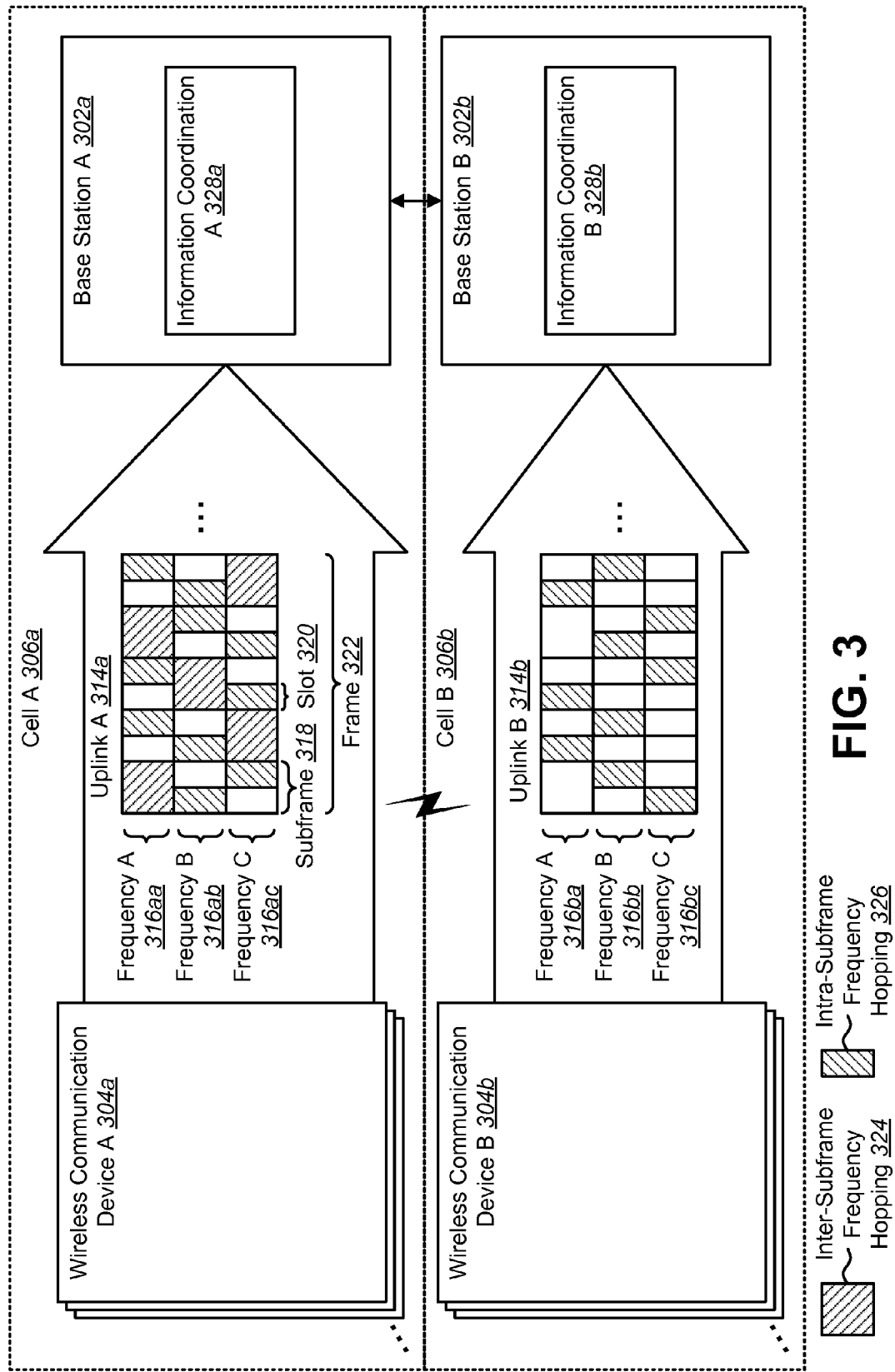
FIG. 3 is a block diagram illustrating one example of uplink resource allocation coordination between base stations.

FIG. 3 is a block diagram illustrating one example of uplink resource allocation coordination between base stations 302a-b. This example illustrates cell A 306a neighboring cell B 306b. Each cell 306a-b respectively includes a base station 302a-b and one or more wireless communication devices 304a-b. Uplink A 314a and uplink B 314b may be similarly structured, each carrying data on frequency A 316aa, 316ba, frequency B 316ab, 316bb and frequency C 316ac, 316bc. The uplinks 314a-b may also have similar frame 322, subframe 318 and slot 320 structures. As was discussed in more detail in connection with FIG. 2, the wireless communication devices 304a-b may utilize inter-subframe frequency-hopping 324 and/or intra-subframe frequency-hopping 326.

In this example, base station A 302a includes information coordination module A 328a and base station B 302b includes information coordination module B 328b. The information coordination modules 328a-b may allow base station A 302 and base station B 302b to communicate such that uplink 314 resources may be allocated to avoid or reduce interference. For example, base station A 302a may send uplink resource allocation information to base station B 302b. In one configuration, base station A 302a sends information regarding how uplink A's 314a resources are scheduled or allocated. Information coordination module B 328b may use base station A's 302a uplink resource allocation information to schedule or allocate the resources on uplink B 314b such that potential interference is avoided or reduced.

The systems and methods disclosed herein describe how base stations 102 may communicate in order to avoid or reduce interference in neighboring cells 106. This approach may allow system resources to be better utilized. For example, wireless communication device B 304b may not need to boost signal power to overcome interference from wireless communication device A 304a, possibly resulting in longer battery life. Furthermore, data may be sent more efficiently, since less overhead (e.g., redundancy, error correction coding, retransmission requests) may be needed to successfully receive and decode data at the base stations 302a-b.

Figure 4:
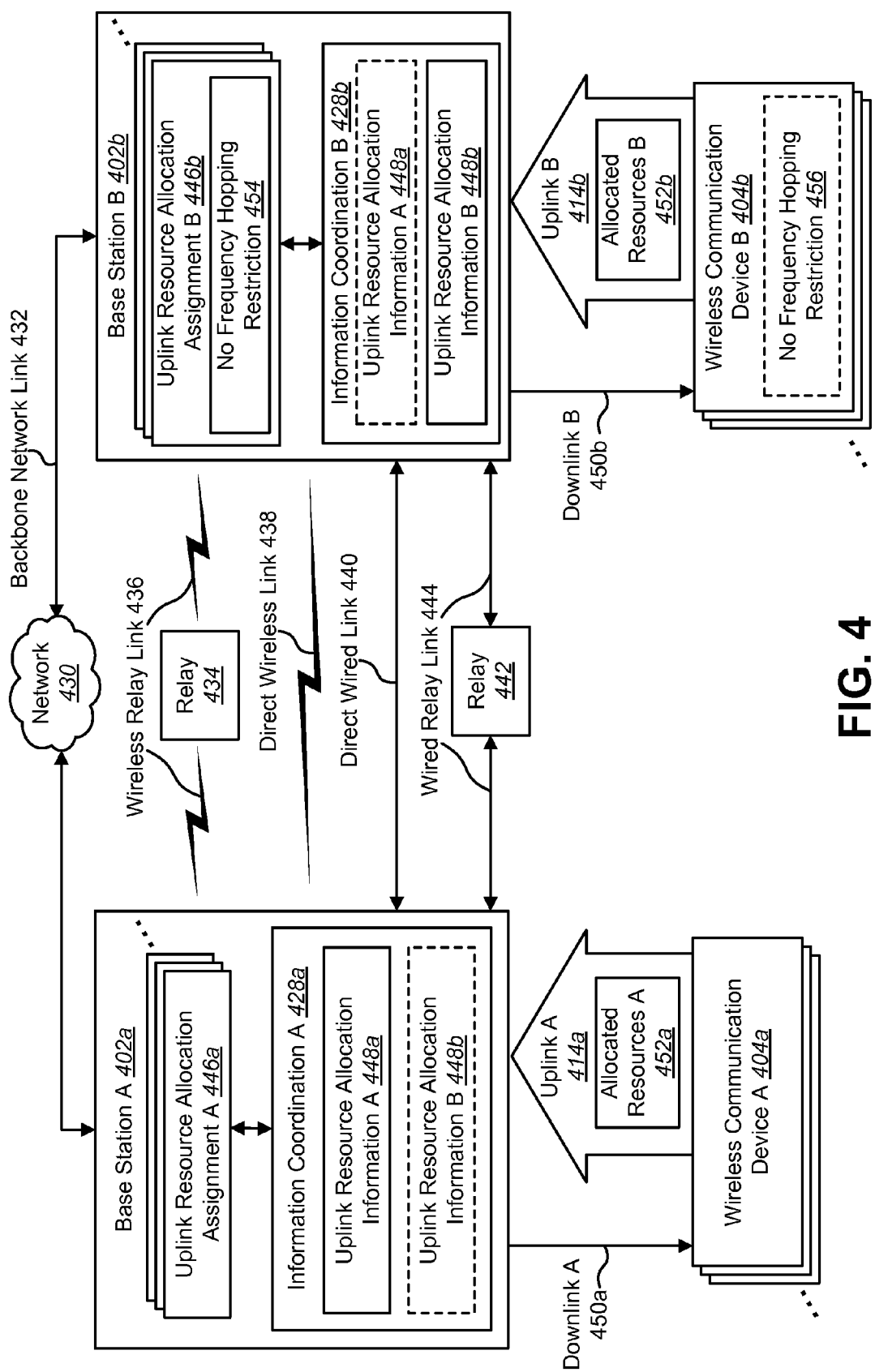
FIG. 4 is a block diagram illustrating some configurations of base stations in which systems and methods for coordinating uplink resource allocation may be implemented.

FIG. 4 is a block diagram illustrating some configurations of base stations 402 in which systems and methods for coordinating uplink resource allocation may be implemented. Base station A 402a may include information coordination module A 428a and one or more uplink resource allocation assignments A 446a. Base station A 402a may transmit data to and/or receive data from one or more wireless communication devices A 404a using downlink A 450a and uplink A 414a, respectively. Similarly, base station B 402b may include information coordination module B 428b and one or more uplink resource allocation assignments B 446b. Furthermore, base station B 402b may transmit data to and/or receive data from one or more wireless communication devices B 404b using downlink B 450b and uplink B 414b, respectively. In one configuration, each uplink 414a-b may comprise a physical uplink shared channel (PUSCH), while each downlink 450a-b may comprise a physical downlink control channel (PDCCH), for example.

Information coordination module A 428a may include uplink resource allocation information A 448a. Uplink resource allocation information A 448a may comprise information that indicates resources that may be allocated (e.g., allocated resources A 452a) to one or more wireless communication devices 404a on uplink A 414a. Similarly, information coordination module B 428b includes uplink resource allocation information B 448b indicating that allocated resources B 452b may be allocated to one or more wireless communication devices 404b on uplink B 414b.

Base station A 402a may send uplink resource allocation information A 448a to base station B 402b. Base station B 402b may receive and/or store uplink resource allocation information A 448a. Conversely, base station B 402b may send uplink resource allocation information B 448b to base station A 402a, which may receive and/or store uplink resource allocation information B 448b. Uplink resource allocation information 448b, 448a received from another base station 402a-b may be used to allocate uplink 414a-b resources 452a-b and generate one or more uplink resource allocation assignments 446a-b.

For example, base station B 402b (e.g., information coordination module B 428b) may generate uplink resource allocation assignment B 446b based on received uplink resource allocation information A 448a. Uplink resource allocation assignment B 446b may then be sent to wireless communication device B 404b, such that wireless communication device B 404b may use allocated resources B 452b on uplink B 414b in a manner that will avoid or reduce interference with communications between wireless communication device A 404a and base station A 402a using allocated resources A 452a on uplink A 414a.

In general, a base station 402 may allocate uplink 414 resources 452 and generate and send uplink resource allocation assignments 446 based on a variety of sources of uplink resource allocation information 448. In one configuration, uplink A 414a resources may be allocated based only on uplink resource allocation information A 448a generated on base station A 402a. In another configuration, uplink A 414a resources may be allocated based only on uplink resource allocation information B 448b generated on base station B 402b. In yet another configuration, base station A 402a may allocate uplink A 414a resources based on uplink resource allocation information A 448a (i.e., generated on base station A 402a) and uplink resource allocation information B 448b that is received from base station B 402b.

By extension, a base station 402 may allocate uplink 414 resources based completely or in part on uplink resource allocation information 448 received from one or more other base stations 402 alternatively or in addition to uplink resource allocation information 448 generated locally on the base station 402. In one configuration, base station A 402a allocates uplink A 414a resources and generates uplink resource allocation assignments A 446a based only on uplink resource allocation information A 448a, while base station B 402b allocates uplink B 414b resources and generates uplink allocation assignments B 446b based both on uplink resource allocation information B 448b and received uplink resource allocation information A 448a.

In one configuration, an uplink resource allocation assignment 446 includes a no frequency-hopping restriction 454. For example, uplink resource allocation assignment B 446b may include a no frequency-hopping restriction 454. Wireless communication device B 404b may receive a no frequency-hopping restriction 456 using downlink B 450b. Thus, wireless communication device B 404b may utilize allocated resources B 452b on uplink B without employing frequency-hopping, for example. In some circumstances, the no frequency-hopping restriction 456 may help avoid or reduce interference with communications between other wireless communication devices 404 and base stations 402. The no frequency-hopping restriction 454 may be generated based on uplink resource allocation information A 448a and/or uplink resource allocation information B 448b, for example.

The uplink resource allocation information 448 may be sent, received, and/or exchanged using various links between base stations 402. In one configuration, the uplink resource allocation information 448 is communicated using a backbone network link 432 over a network 430. In another configuration, the uplink resource allocation information 448 is communicated using a direct wireless link 438 between base stations 402. Alternatively, a wireless relay link 436 may be used to communicate the uplink resource allocation information 448 over one or more relays 434 between base stations 402. One example of a wireless relay link 436 is an XS link. For example, a base station (e.g., eNodeB) 402 may communicate uplink resource allocation information 448 to a relay using an XS wireless relay link 436. In yet another configuration, one base station 402 may send, receive and/or exchange the uplink resource allocation information 448 using a direct wired link 440. The direct wired link 440 may be an X2 wired link, for example. An XS (e.g., wireless) link may be similar to an X2 interface (e.g., wired link 440). As another alternative, the uplink resource allocation information 448 may be communicated using a wired relay link 444 over one or more relays 442. In the wired relay case, a relay may be "remote radio equipment," which may use the wired relay link 444.

Figure 5:
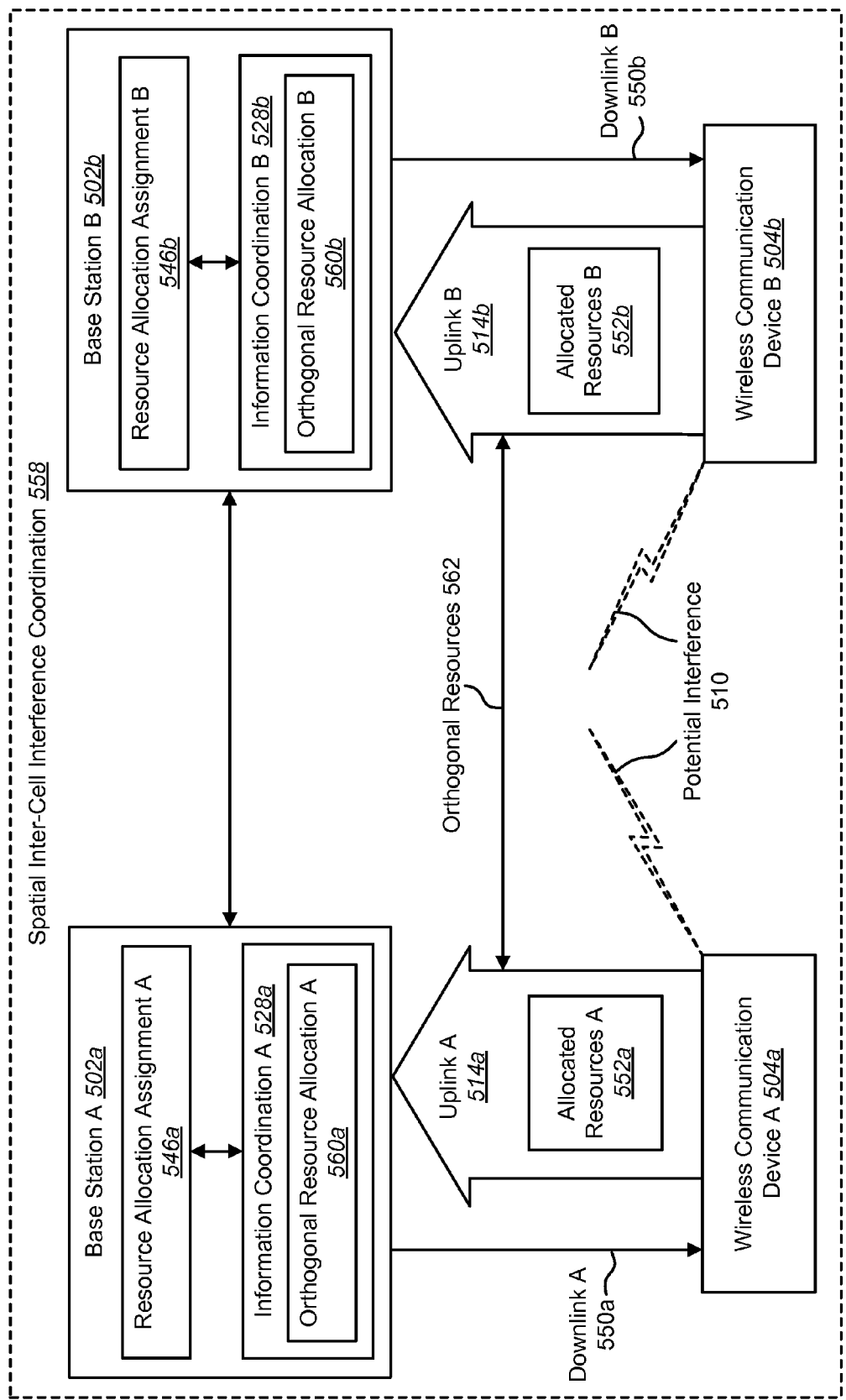
FIG. 5 is a block diagram illustrating one configuration of systems and methods for coordinating uplink resource allocation that allows spatial inter-cell interference coordination.

FIG. 5 is a block diagram illustrating one configuration of systems and methods for coordinating uplink resource allocation that allows spatial inter-cell interference coordination 558. In spatial inter-cell interference coordination (spatial ICIC) 558, potentially interfering 510 wireless communication devices 504a-b are assigned orthogonal resources 562 so as to not cause potential interference 510. More specifically, spatial inter-cell interference coordination 558 allows orthogonal resources 562 to be assigned between uplinks 514 being serviced by different base stations 502. The orthogonal resources 562 may typically be in the spatial domain (e.g., two spatial resources may be orthogonalized using beamforming). For example, base station A 502a may include resource allocation assignment A 546a based on orthogonal resource allocation A 560a included in information coordination module A 528a. Resource allocation assignment A 546a may be sent to wireless communication device A 504a using downlink A 550a in order to utilize allocated resources A 552a on uplink A 514a.

Orthogonal resource allocation A 560a may be sent to base station B 502b. Information coordination module B 528b may use orthogonal resource allocation A 560a to generate resource allocation assignment B 546b, which may be sent to wireless communication device B 504b using downlink B 550b. Wireless communication device B 504b may then use allocated resources B 552b on uplink B 514b. As allocated resources A 552a and allocated resources B 552b are orthogonal resources 562 (i.e., orthogonal to each other), potential interference 510 may be avoided or reduced. As an alternative, orthogonal resource allocation B 560b may be sent to base station A 502a, which may use it to generate resource allocation assignment A 546a and so on.

Figure 6:
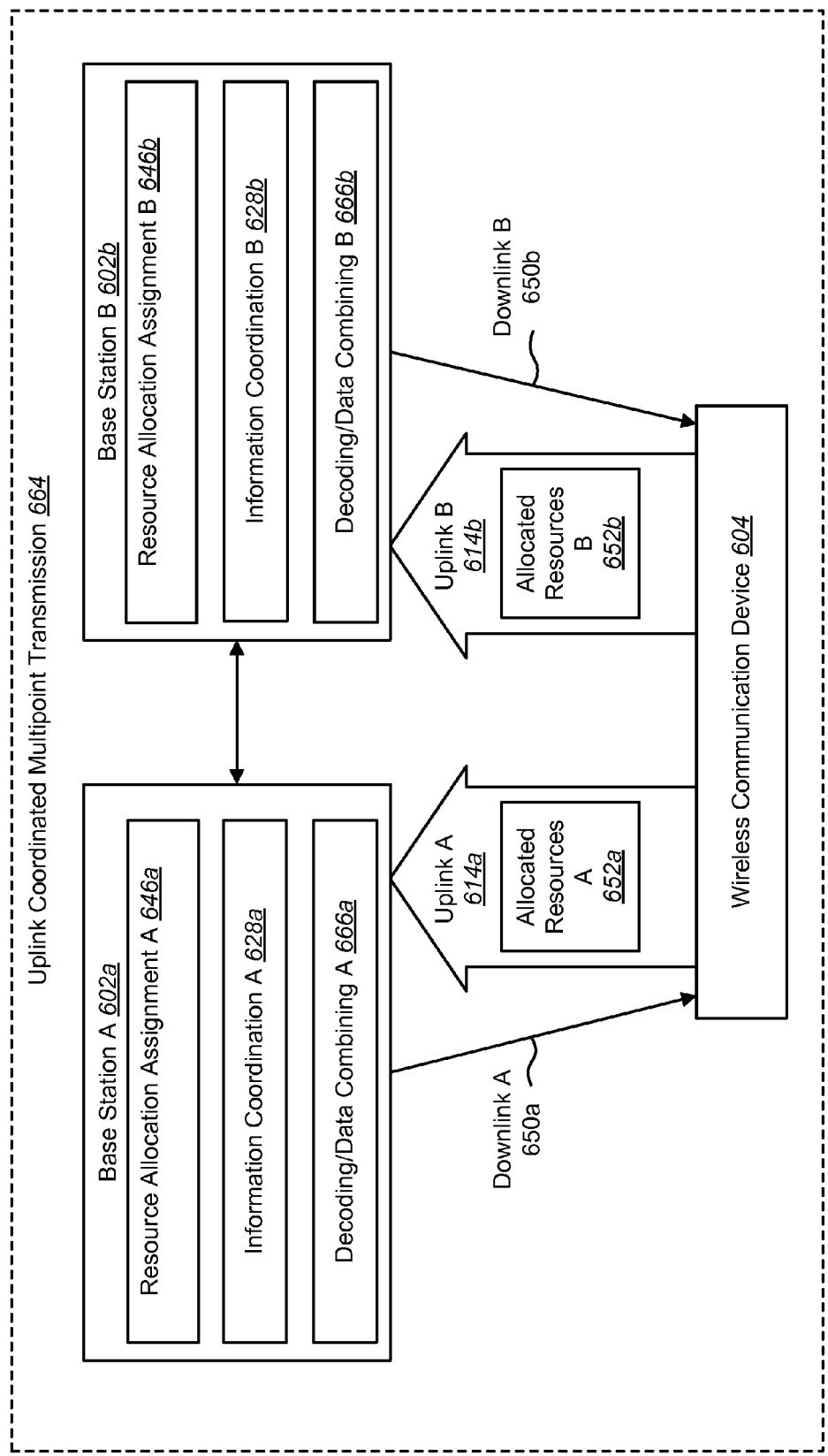
FIG. 6 is a block diagram illustrating one configuration of systems and methods for coordinating uplink resource allocation that allows uplink coordinated multipoint transmission.

FIG. 6 is a block diagram illustrating one configuration of systems and methods for coordinating uplink resource allocation that allows uplink coordinated multipoint transmission 664. In uplink multipoint transmission (UL CoMP) 664, more than one base station 602 (e.g., eNodeB) may receive a data transmission from a wireless communication device 604 (e.g., UE) and individually or jointly decode and/or combine the data. For example, base station A 602a may include decoding/data combining module A 666a. Additionally, base station B 602b may include decoding/data combining module B 666b. The decoding/data combining modules 666a-b allow the base stations 602a-b to individually and/or jointly decode and/or combine data sent from the wireless communication device 604.

The base stations 602a-b may include information coordination modules 628a-b to enable such joint data reception, decoding and/or combining. For example, base station A 602a and/or base station B 602b may send, receive, and/or exchange scheduling and/or resource allocation information in order to coordinate data reception. In one configuration, base station A 602a generates resource allocation assignment A 646a. Resource allocation assignment A 646a may be sent to the wireless communication device 604 using downlink A 650a in order to schedule the wireless communication device's 604 use of allocated resources A 652a on uplink A 614a. Base station A 602a may send uplink resource allocation information to base station B 602b. Base station B 602b may use the uplink resource allocation information to allocate resources on uplink B 614b. Resource allocation assignment B 646b may or may not be sent to the wireless communication device 604 using downlink B 650b. Base station B 602b may allocate allocated resources B 652b on uplink B 614b such that the wireless communication device's 604 use of allocated resources B 652b is anticipated.

Figure 7:
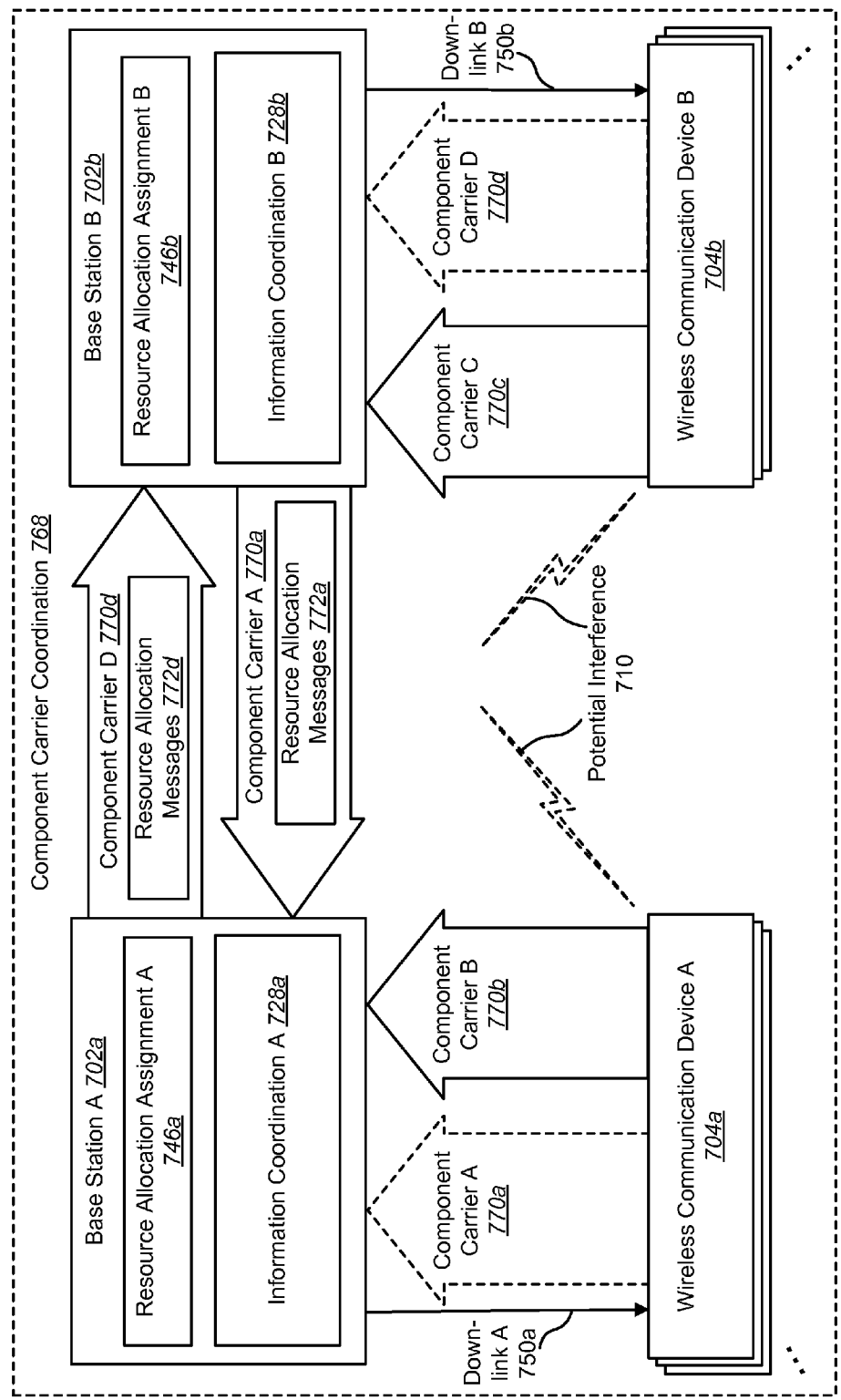
FIG. 7 is a block diagram illustrating one configuration of systems and methods for coordinating uplink resource allocation that allows component carrier coordination.

FIG. 7 is a block diagram illustrating one configuration of systems and methods for coordinating uplink resource allocation that allows component carrier coordination 768. In component carrier coordination (CC coordination) 768, base stations 702a-b may deploy more than one component carrier 770. In one configuration, base station A 702a deploys component carrier A 770a and component carrier B 770b. Additionally, base station B 702b deploys component carrier C 770c and component carrier D 770d.

Potential interference 710 may be mitigated or avoided amongst component carriers 770 of neighboring base stations 702a-b by exchanging resource allocation messages 772a, 772d across different component carriers 770a, 770d. For example, base station A 702a may generate resource allocation assignment A 746a and send it to one or more wireless communication devices A 704a using downlink A 750a. Using information coordination module A 728a, base station A 702a may send one or more resource allocation messages 772d over component carrier D 770d, which is deployed by base station B 702b.

Alternatively or in addition, base station B 702b may use information coordination module B 728b to send one or more resource allocation messages 772a using component carrier A 770a, which is deployed by base station A 702a. In other configurations, base station A 702a may send resource allocation messages 772d to base station B 702b using a direct wired link 440, direct wireless link 438, wireless relay link 436 or wired relay link 444, for example. The exchange of resource allocation messages 772a, 772d enables different component carriers (e.g., component carrier B 770b, component carrier C 770c) to be aware of potentially interfering 710 resources being used by a wireless communication devices 704a-b in adjacent component carriers (e.g. component carrier B 770b and component carrier C 770c).

For example, base station B 702b may use resource allocation messages 772d received from base station A 702a to generate resource allocation assignment B 746b and send it to one or more wireless communication devices B 704b using downlink B 750b. In this manner, component carrier C 770c may use resources that are allocated (i.e., according to resource allocation assignment B 746b) to reduce or avoid potential interference 710 with component carrier B 770b. Optionally or additionally, base station A 702a may use resource allocation messages 772a received from base station B 702b to generate resource allocation assignment A 746a and send it to wireless communication device A 704a using downlink A 750a. This may allow component carrier B 770b to reduce or avoid potential interference with component carrier C 770c. Stated simply, the systems and methods herein that are applicable to a single component carrier 770 may be extended to multiple component carriers 770. In this context, coordination may take place amongst base stations 702 that support similar component carriers 770 that may interfere with each other.

Spatial inter-cell interference coordination 558, uplink coordinated multipoint transmission 664 and component carrier coordination 768 (i.e., as illustrated in FIGS. 5, 6 and 7) may help reduce interference and improve throughput performance. These technologies may be used in 3GPP Release 10 and beyond. As illustrated in FIGS. 5, 6, and 7, adjacent base stations 102 (e.g., eNodeBs) may need to be aware of the resources used by a potentially interfering wireless communication device 104 in another cell 106. For instance, if a hopping pattern is unknown to an adjacent base station 102 (e.g., eNodeB), the adjacent base station 102 may not be able to coordinate the resource allocation of its own wireless communication devices 104 (i.e., in its serving cell 106), and hence, may suffer from interference. However, the systems and methods disclosed herein describe how wireless communication device 104 resource allocation information can be exchanged and how signaling may be reduced among base stations 102 (e.g., eNodeBs).

Figure 8:
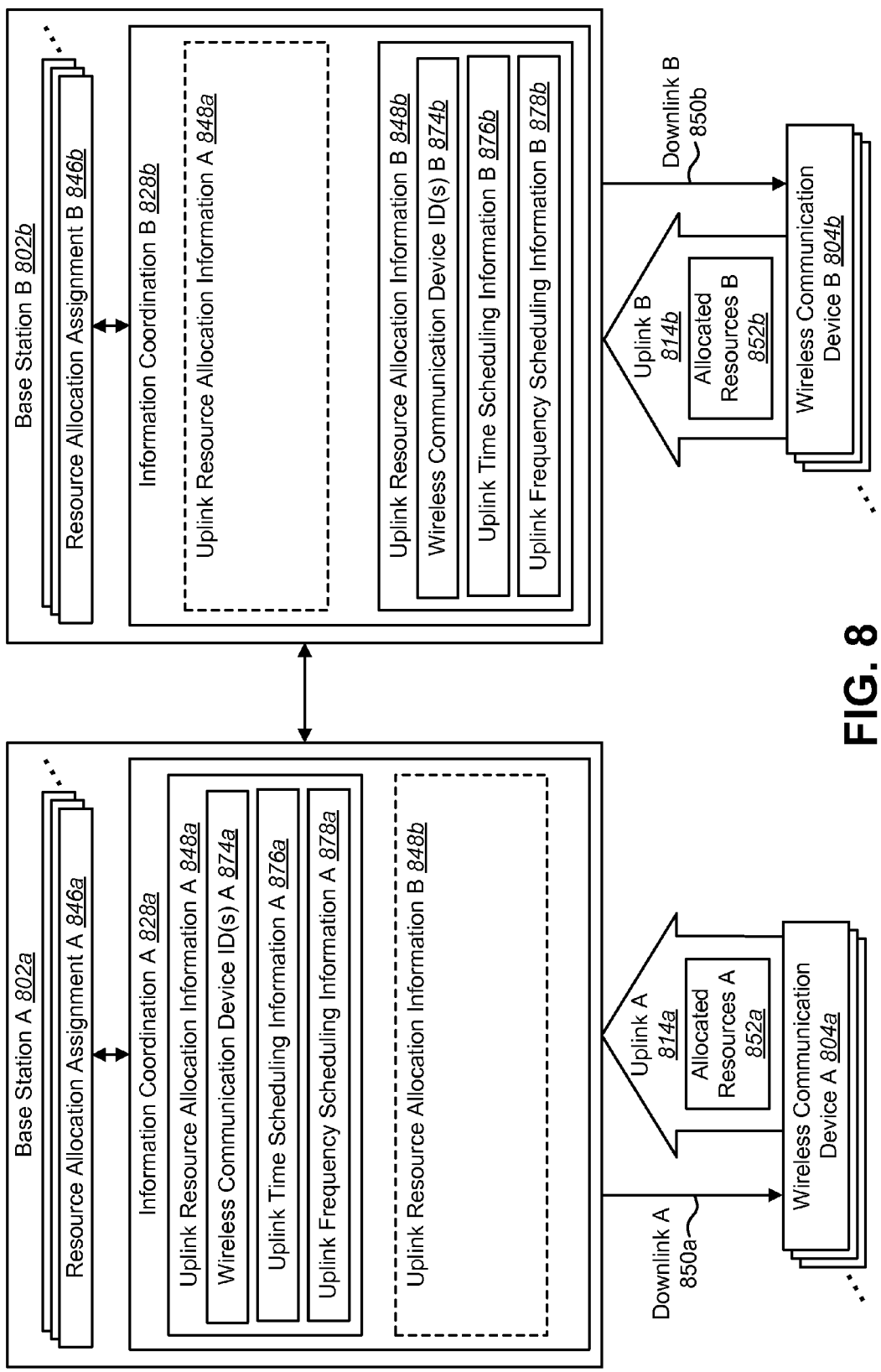
FIG. 8 is a block diagram illustrating some configurations of base stations in which systems and methods for coordinating uplink resource allocation may be implemented.

FIG. 8 is a block diagram illustrating some configurations of base stations 802a-b in which systems and methods for coordinating uplink resource allocation may be implemented. In general, base station A 802a and base station B 802b may respectively include one or more resource allocation assignments 846a-b and information coordination modules 828a-b. Additionally, each base station 802a-b may communicate with one or more wireless communication devices 804a-b using respective downlinks 850a-b and uplinks 814a-b (e.g., using allocated resources 852a-b on each uplink 814a-b). Furthermore, base station A 802a may communicate with base station B 802b as discussed above in connection with FIG. 4. Each base station 802a-b may allocate resources on their respective uplinks 814a-b and generate resource allocation assignments 846a-b based on one or more sets of uplink resource allocation information 848. The one or more resource allocation assignments 846a-b on each base station 802a-b may be sent to the wireless communication devices 804a-b using respective downlinks 850a-b. Each of the wireless communication devices 804a-b may use a resource allocation assignment 846a-b from their respective base station 802a-b to utilize allocated resources 852a-b on a corresponding uplink 814a-b.

In one configuration, uplink resource allocation information 848 includes wireless communication device identification (ID(s)) 874, uplink time scheduling information 876 and uplink frequency scheduling information 878. Wireless communication device ID(s) 874 may be information that identifies one or more wireless communication devices 804 being served by a base station 802. In one example, wireless communication device ID(s) A 874a comprise information that identifies one or more wireless communication devices A 804a being served by base station A 802a.

Uplink time scheduling information 876 may be information that designates time resources (e.g., one or more time frames 322, subframes 318 and/or slots 320) allocated to one or more wireless communication devices 804 on an uplink 814. For example, uplink time scheduling information A 876a designates time resources allocated to one or more wireless communication devices 804a being served by base station A 802a.

Uplink frequency scheduling information 878 may be information that designates frequency resources (e.g., one or more frequency carriers 316, sub-carriers, and/or component carriers) allocated to one or more wireless communication devices 804. For example, uplink frequency scheduling information A 878a designates frequency resources allocated to one or more wireless communication devices 804a served by base station A 802a. In summary, wireless communication device ID(s) 874, uplink time scheduling information 876 and uplink frequency scheduling information 878 identify allocated resources 852 for wireless communication devices 804 being served by a particular base station 802.

Base stations 802a-b may use differing procedures and combinations of uplink resource allocation information 848 to allocate uplink 814 resources. In one configuration, base station A 802a generates uplink resource allocation information A 848a to allocate uplink A 814a resources and generate and send one or more resource allocation assignments 846a (e.g., to wireless communication devices A 804a). In this configuration, uplink resource allocation information A 848a is sent to base station B 802b. Base station B 802b receives and/or stores uplink resource allocation information A 848a, including wireless communication device ID(s) A 874a, uplink time scheduling information A 876a and/or uplink frequency scheduling information A 878a. Base station B 802b then uses this information 848a to allocate resources on uplink B 814b and generate and send one or more resource allocation assignments 846b to one or more wireless communication devices B 804b using downlink B 850b. Thus, allocated resources B 852b may be allocated and utilized such that they reduce or avoid interference with allocated resources A 852a.

In another configuration, base station B 802b generates uplink resource allocation information B 848b, including one or more wireless communication device IDs B 874b, uplink time scheduling information B 876b and uplink frequency scheduling information B 878b. In this configuration, base station B 802b (e.g., information coordination module B 828b) additionally receives uplink resources allocation information A 848a. Both uplink resource allocation information B 848b and the received uplink resource allocation information A 848a may be used by base station B 802b to allocate uplink resources and generate and send one or more resource allocation assignments B 846b. In other words, uplink resources may be allocated (e.g., allocated resources B 852b on uplink B 814b) and one or more resource allocation assignments B 846b may be generated by base station B 802b based on both uplink resource allocation information B 848b (i.e., which was generated by base station B 802b) and uplink resource allocation information A 848a (i.e., which was received from base station A 802a).

In yet another configuration, base station A 802a receives uplink resource allocation information B 848b, including wireless communication device ID(s) B 874b, uplink time scheduling information B 876b and uplink frequency scheduling information B 878b from base station B 802b. Base station A 802a may use uplink resource allocation information B 848b alternatively or in addition to uplink resource allocation information A 848a to allocate allocated resources A 852a and generate and send one or more resource allocation assignments A 846a to one or more wireless communication devices A 804a.

Figure 9:
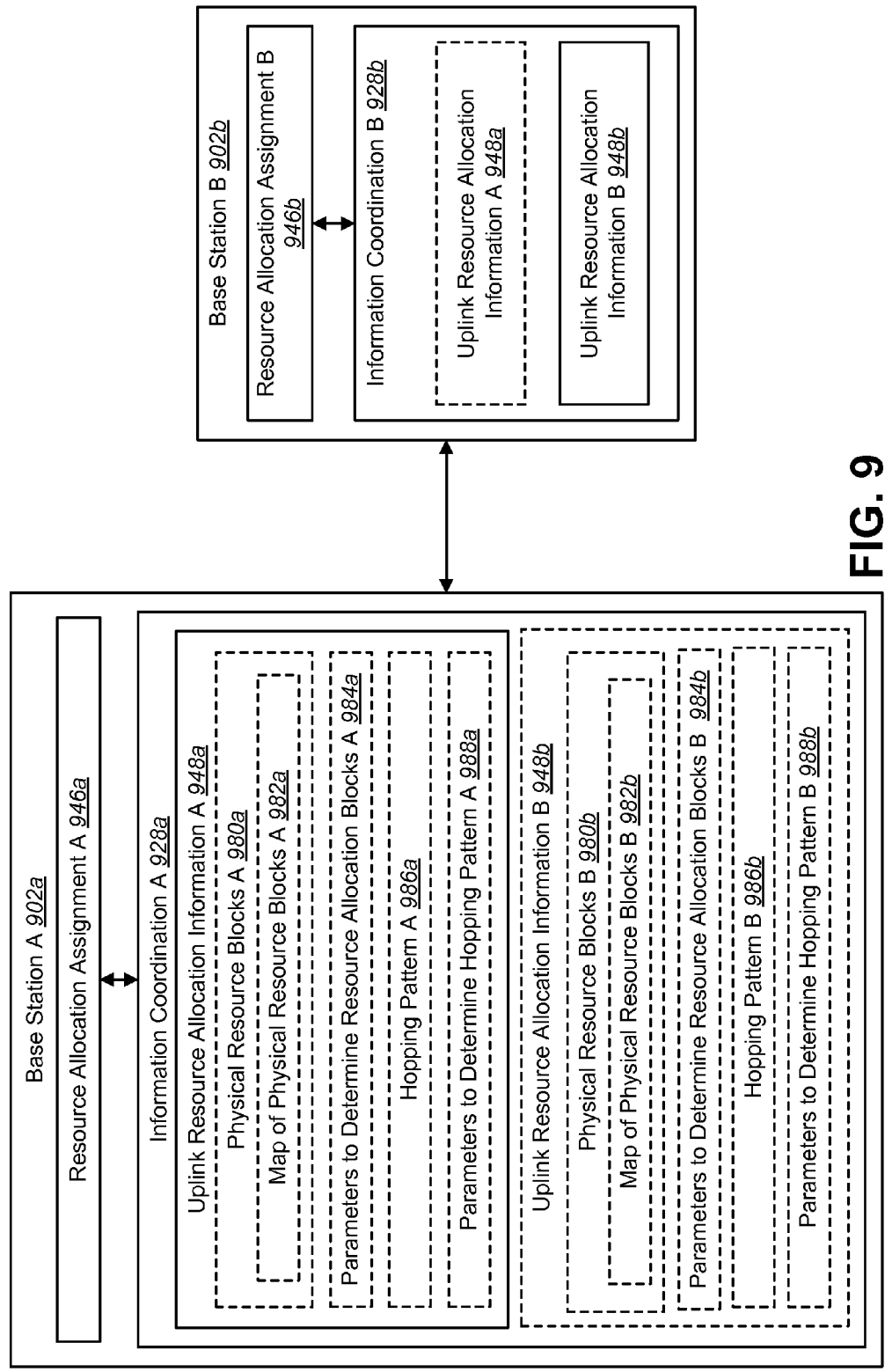
FIG. 9 is a block diagram illustrating some configurations of a base station in which systems and methods for coordinating uplink resource allocation may be implemented.

FIG. 9 is a block diagram illustrating some configurations of a base station 902 in which systems and methods for coordinating uplink resource allocation may be implemented. Base station A 902a may include one or more resource allocation assignments A 946a and an information coordination module A 928a. Similarly, one or more resource allocation assignments B 946b and information coordination module B 928b may be included on base station B 902b. Information coordination module A 928a and information coordination module B 928b may include uplink resource allocation information A 948a and uplink resource allocation information B 948b. For convenience, less detail is illustrated in information coordination module B 928b. However, similar information may be included in both information coordination modules A and B 928a-b.

Uplink resource allocation information A 948a and uplink resource allocation information B 948b may be configured to include a certain type of information or combinations of different types of information generally used to allocate and/or schedule uplink data transmissions.

In one configuration, uplink resource allocation information A 948a comprises physical resource blocks A 980a. The physical resource blocks A 980a may be, for example, the actual resource allocation or physical resource blocks allocated to a wireless communication device (e.g., UE) on an uplink channel (e.g., PUSCH). For instance, the physical resource blocks A 980a may comprise a map of physical resource blocks 982a such as a bitmap that maps the physical resource blocks A 980a (e.g. PRBs) used by a wireless communication device 104 (e.g., UE). The physical resource blocks A 980a may be signaled or sent to adjacent base station B 902b (e.g., eNodeB).

In another configuration, the uplink resource allocation information A 948a comprises parameters 984a to determine resource allocation blocks A. For example, parameters 984a to determine resource allocation blocks A may be parameters by which neighboring base station B 902b (e.g., or relays, HeNBs, etc.) may determine or obtain the resource allocation blocks used by a potentially interfering wireless communication device 104 (e.g., UE).

In yet another configuration, uplink resource allocation information A 948a comprises hopping pattern A 986a. Hopping pattern A 986a may be a predefined hopping pattern that is being used by one or more wireless communication devices 104 being served by base station A 902a that could potentially interfere with wireless communication devices 104 being served by base station B 902b. In yet another configuration, uplink resource allocation information A 948a comprises parameters 988a to determine hopping pattern A 986a. The parameters 988a to determine hopping pattern A 986a may be parameters that base station B 902b may use to determine or obtain a predefined hopping pattern being used by one or more potentially interfering wireless communication devices 104 (e.g., UEs) being served by base station A 902a.

In other configurations, uplink resource allocation information A 948a may comprise combinations of different types of information. In one example, uplink resource allocation information A 948a comprises parameters 984a to determine resource allocation blocks A and hopping pattern A 986*a*. Other combinations of physical resource blocks A 980*a*, parameters 984*a* to determine resource allocation blocks A, hopping pattern A 986*a* and parameters 988*a* to determine hopping pattern A may be used.

Base station A 902*a* may receive uplink resource allocation information B 948*b* from base station B 902*b*. Uplink resource allocation information B 948*b* may comprise information similar to uplink resource allocation information A 948*a*. For example, uplink resource allocation information B 948*b* may comprise physical resource blocks B 980*b* (e.g., which may comprise a map of physical resource blocks B 982*b*), parameters 984*b* to determine resource allocation blocks B, hopping pattern B 986*b*, parameters 988*b* to determine hopping pattern B or some combination of the foregoing 980*b*, 984*b*, 986*b*, 988*b*. Base station A 902*a* may use uplink resource allocation information B 948*b* to determine resource blocks and/or a frequency hopping pattern allocated to a wireless communication device 104 being served by base station B 902*b*. Uplink resource allocation information B 948*b* may be used in conjunction with or separately from uplink resource allocation information A 948*a* in order to allocate resources and generate and send a resource allocation assignment 946*a* to one or more wireless communication devices 104 being served by base station A 902*a*.

Figure 10:
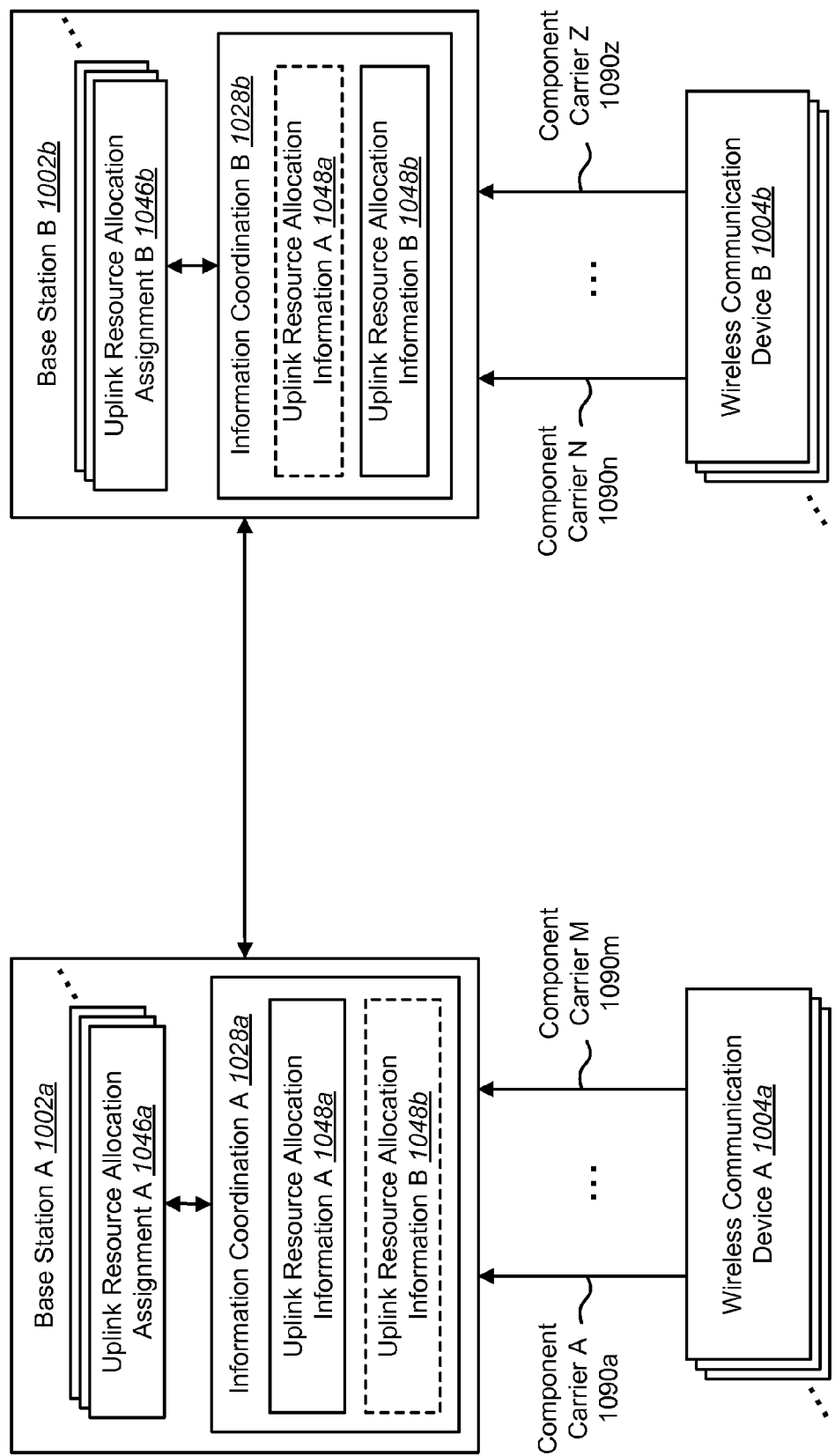
FIG. 10 is a block diagram illustrating some configurations of a base station in which systems and methods for coordinating uplink resource allocation may be implemented.

FIG. 10 is a block diagram illustrating some configurations of a base station 1002 in which systems and methods for coordinating uplink resource allocation may be implemented. Base station A 1002*a* and base station B 1002*b* may respectively include information coordination modules 1028*a-b* and one or more resource allocation assignments 1046*a-b*. Information coordination modules A and B 1028*a-b* may include uplink resource allocation information A 1048*a* and/or uplink resource allocation information B 1048*b*. As discussed in connection with FIG. 4, base stations A and B 1002*a-b* may communicate with and/or exchange information with each other.

FIG. 10 further illustrates several component carriers 1090. For example, base station A 1002*a* may communicate with one or more wireless communication devices A 1004*a* using multiple component carriers A to M 1090*a-m*. Component carriers N to Z 1090*n-z*, on the other hand, may be used by base station B 1002*b* to communicate with one or more wireless communication devices B 1004*b*. In other words, different base stations 1002*a-b* (e.g., or relays, HeNBs, etc.) may deploy more than one component carrier 1090 (e.g., in 3GPP LTE Release 10 and beyond).

Each component carrier 1090 may include time and frequency resources and/or employ frequency-hopping patterns. Information coordination modules A and B 1028*a-b* may send, receive and/or exchange uplink resource allocation information 1048 in order to coordinate resource allocation between adjacent component carriers 1090. For example, assume that component carrier M 1090*m* and component carrier N 1090*n* are "adjacent" in frequency. Information coordination modules A and B 1028*a-b* may send, receive and/or exchange uplink resource allocation information 1048 (e.g., resource allocation messages) in order to allocate component carrier 1090 resources such that potential interference between component carrier M 1090*m* and component carrier N 1090*n* may be reduced or avoided. In short, the information systems and methods described herein may be extended to each of the component carriers 1090 where different base stations 1002*a-b* (e.g., or relays, HeNBs, etc.) may deploy more than one component carrier 1090.

In the case of a multiple component carrier 1090 deployment, the resource allocation messages described above may be exchanged amongst each of the component carriers A to M 1090*a-m* of base station A 1002*a*. Furthermore, potentially interfering component carriers N to Z 1090*n-z* of base station B 1002*b* may coordinate their resources as described above in order to reduce or avoid potential interference. Although only a few component carriers 1090 are illustrated in FIG. 10, any number of component carriers 1090 may be used.

Figure 11:
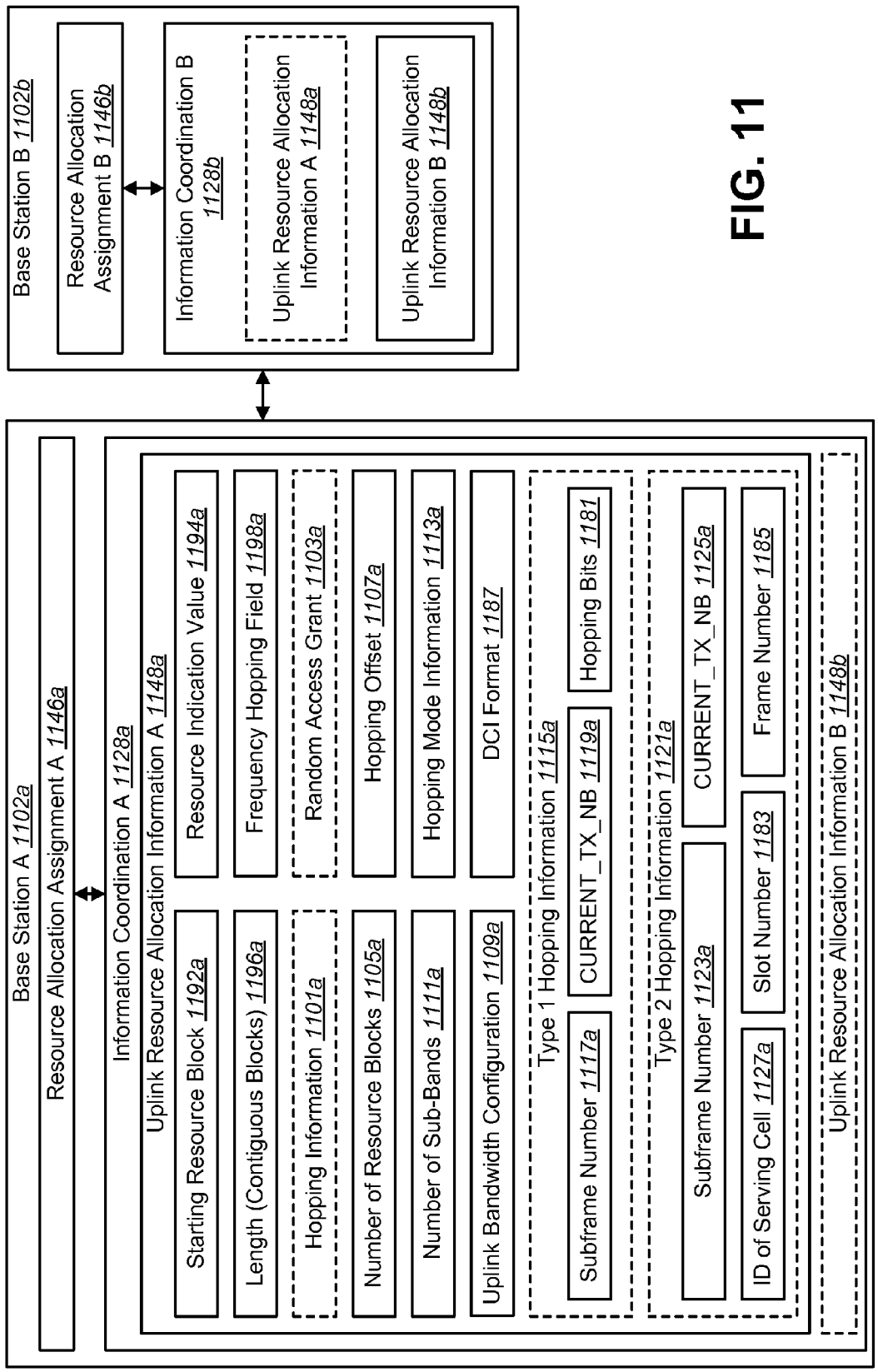
FIG. 11 is a block diagram illustrating more configurations of a base station in which systems and methods for coordinating uplink resource allocation may be implemented.

FIG. 11 is a block diagram illustrating more configurations of a base station 1102 in which systems and methods for coordinating uplink resource allocation may be implemented. Base stations A and B 1102*a-b* may include one or more resource allocation assignments A and B 1146*a-b* and information coordination modules A and B 1128*a-b* respectively. The information coordination modules A and B 1128*a-b* may include uplink resource allocation information A 1148*a* and/or uplink resource allocation information B 1148*b*. Uplink resource allocation information A and B 1148*a-b* may comprise similar types of information, depending on the implementation. For convenience, the various types of information that may be included are illustrated only within uplink resource allocation information A 1148*a* located on base station A 1102*a*. However, similar types of information may be included in uplink resource allocation information A 1148*a* located on base station B 1102*b*, as well as within uplink resource allocation information B 1148*b* located on base stations A and B 1102*a-b*.

In FIG. 11, various types of information will be described in terms of 3GPP specifications. More specifically, various types of information that may be sent, received and/or exchanged by base stations 1102 in order to coordinate uplink resource allocation will be described in terms of 3GPP specifications. However, this should not limit the scope of the disclosure, as the systems and methods described herein may be applied to other wireless communication systems and/or standards.

In 3GPP Release 8, a physical resource block (PRB) (e.g., or simply resource block (RB)) is defined as a given number of consecutive symbols in the time domain and a given number of consecutive subcarriers in the frequency domain. A block of complex-valued symbols $z(0), \ldots, z(M_{symb}-1)$ may be mapped to resource elements (k, l) that correspond to physical resource blocks (PRBs) assigned for transmission (e.g., on an uplink) in increasing order of index k first and then index l, starting with a first slot (e.g., slot 220) in a subframe (e.g., subframe 218). $M_{symb}$ represents a number of modulated symbols and (k, l) represents a resource element with frequency-domain index k and time-domain index l. The complex-valued symbols described may not correspond to physical resource blocks (PRBs) used for transmission of reference signals and/or transmission of one or more possible sounding reference signals (SRS).

If uplink frequency-hopping is disabled, the set of physical resource blocks (i.e., denoted by $n_{PRB}$) to be used for transmission may be given by $n_{PRB}=n_{VRB}$ where $n_{VRB}$ is a set of virtual resource blocks (i.e., denoted by $n_{VRB}$) that may be obtained from an uplink scheduling grant. An uplink scheduling grant may be a message sent to a wireless communication device 104 (e.g., UE) from a base station 102 (e.g., nodeB, eNB, etc.) using a downlink 450 (e.g., physical downlink control channel (PDCCH)) that notifies the wireless communication device 104 of scheduled uplink resources that the wireless communication device 104 may utilize.

Uplink resource allocation information A 1148*a* may indicate to a scheduled wireless communication device (e.g., UE) 104 a set of contiguously allocated virtual resource block indices (i.e., denoted by $n_{VRB}$). A resource allocation field in the scheduling grant may comprise a resource indication value (i.e., RIV) 1194a corresponding to a starting resource block (i.e., $RB_{START}$) 1192a and a length in terms of contiguously allocated resource blocks (i.e., $L_{CRBs} \geq 1$) 1196a. The resource indication values may be defined as shown in Equation (1).

$$\begin{aligned} &\text{if } (L_{CRBs} - 1) \leq \lfloor N_{RB}^{UL}/2 \rfloor \text{ then} && \text{Equation (1)}\\ &RIV = N_{RB}^{UL}(L_{CRBs} - 1) + RB_{START}\\ &\text{else}\\ &RIV = N_{RB}^{UL}(N_{RB}^{UL} - L_{CRBs} + 1) + (N_{RB}^{UL} - 1 - RB_{START}) \end{aligned}$$

$N_{RB}^{UL}$ represents an uplink bandwidth configuration 1109a, which may be expressed in units of $N_{sc}^{RB}$. $N_{sc}^{RB}$ represents a resource block size in the frequency domain, expressed as a number of subcarriers. A wireless communication device (e.g., UE) 104 may discard physical uplink shared channel (PUSCH) resource allocation in the corresponding physical downlink control channel (PDCCH) with downlink control information (DCI) message format 0 if consistent control information is not detected. Downlink control information (DCI) format 0 may be used for the transmission of resource grants for the physical uplink shared channel (PUSCH).

Hence, adjacent base station B 1102b may need to know the resource indication value (RIV) 1194a corresponding to a starting resource block ($RB_{START}$) 1192a and a length in terms of contiguously allocated resource blocks ($L_{CRBs} \geq 1$) 1196a to determine the resource allocation of a potentially interfering wireless communication device (e.g., UE) 104 being served by base station A 1102a. Such information may be exchanged over a wired (e.g., X2), wireless, wireless relay (e.g., XS) and/or wired relay interface between adjacent base stations 1102a-b. Moreover, the wireless communication device (e.g., UE) 104 may perform physical uplink shared channel (PUSCH) frequency-hopping if a single-bit frequency-hopping (FH) field 1198a in a corresponding physical downlink control channel (PDCCH) with downlink control information (DCI) format 0 is set to 1. Otherwise, no physical uplink shared channel (PUSCH) frequency-hopping may be performed. Hence, the frequency-hopping (FH) field 1198a in the corresponding downlink control information DCI format 0 may be exchanged amongst base stations A and B 1102a-b.

A wireless communication device (e.g., UE) 104 performing physical uplink shared channel (PUSCH) frequency-hopping may determine its physical uplink shared channel (PUSCH) resource allocation (RA) for the first slot of a subframe (S1) including the lowest index physical resource block (PRB) (i.e., denoted $n_{PRB}^{S1}(n)$) in subframe n (e.g., n may indicate the subframe in this case, since this is for the first slot) from the resource allocation field in the latest physical downlink control channel (PDCCH) with downlink control information (DCI) format 0 for the same transport block. Therefore, the downlink control information (DCI) format 0 (e.g., or parts of it) 1187 may be exchanged amongst base stations (e.g., eNodeBs) for coordination purposes. If there is no physical downlink control channel (PDCCH) for the same transport block, the wireless communication device 104 (e.g., UE) may determine its hopping type based on one of two pieces of information. The first piece of information is the hopping information 1101a in the most recent semi-persistent scheduling assignment from the physical downlink control channel (PDCCH), when the initial physical uplink shared channel (PUSCH) for the same transport block is semi-persistently scheduled. The second piece of information is a random access response grant 1103a for the same transport block, when the physical uplink shared channel (PUSCH) is initiated by the random access response grant.

Hence, in order to support information coordination when there is no physical downlink control channel (PDCCH) for the same transport block, adjacent base stations A and B 1102a-b may use the hopping information 1101a in the initial physical uplink shared channel (PUSCH) for the same transport block which is semi-persistently scheduled or the random access response grant 1103a for the same transport block when the physical uplink shared channel (PUSCH) is initiated by the random access response grant.

The resource allocation field in downlink control information (DCI) format 0 may exclude either 1 or 2 bits used for hopping information (i.e., as indicated by Table (1) below) where the number of physical uplink shared channel (PUSCH) resource blocks 1105a may be defined as shown in Equation (2).

$$N_{RB}^{PUSCH} = \begin{cases} N_{RB}^{UL} - \tilde{N}_{RB}^{HO} - & \text{Type 1 } PUSCH \text{ hopping} \\ (N_{RB}^{UL} \text{mod} 2) & \\ N_{RB}^{UL} & \text{Type } 2N_{sb} = 1 \text{ } PUSCH \text{ hopping} \\ N_{RB}^{UL} - \tilde{N}_{RB}^{HO} & \text{Type } 2N_{sb} > 1 \text{ } PUSCH \text{ hopping} \end{cases} \quad \text{Equation (2)}$$

$N_{RB}^{PUSCH}$ 1105a is the number of physical uplink shared channel resource blocks. $N_{RB}^{HO}$ 1107a is an offset (i.e., "pusch-HoppingOffset") used for physical uplink shared channel (PUSCH) frequency hopping, which may be expressed in a number of resource blocks. $N_{sb}$ is a number of sub-bands 1111a. In accordance with 3GPP specifications, wireless communication devices 104 may be capable of performing two types of hopping, denoted "type 1" hopping and "type 2" hopping. For type 1 and type 2 physical uplink shared channel (PUSCH) hopping, $\tilde{N}_{RB}^{HO} = N_{RB}^{HO} + 1$ if $N_{RB}^{HO}$ 1107a is an odd number. $\tilde{N}_{RB}^{HO} = N_{RB}^{HO}$ in other cases. The parameter pusch-HoppingOffset (i.e., $N_{RB}^{HO}$) 1107a may be provided by layers that are higher than the physical layer in accordance with 3GPP specifications.

The uplink bandwidth configuration (i.e., NA) 1109a and the pusch-HoppingOffset (i.e., $N_{RB}^{HO}$) 1107a may be exchanged amongst base stations A and B 1102a-b. Alternatively, the number of resource blocks (i.e., denoted $N_{RB}^{PUSCH}$) 1105a may be exchanged amongst base stations A and B 1102a-b.

The number of sub-bands 1111a (i.e., $N_{sb}$) may be used to coordinate uplink resource allocation, and thus may be exchanged amongst base stations A and B 1102a-b. The size of the resource allocation field in downlink control information (DCI) format 0 after excluding either 1 or 2 bits may be $y = \lceil \log_2(N_{RB}^{UL}(N_{RB}^{UL}+1)/2) \rceil - N_{UL\_hop}$, where $N_{UL\_hop} = 1$ or 2 bits. The number of contiguous resource blocks (RBs) that may be assigned to a type 1 hopping user may be limited to $\lfloor 2^y/N_{Rb}^{UL} \rfloor$. The number of contiguous resource blocks that may be assigned to a type 2 hopping user may be limited to $\min(\lfloor 2^y/N_{RB}^{UL} \rfloor, \lfloor N_{RB}^{PUSCH}/N_{sb} \rfloor)$, where the number of sub-bands 1111a (i.e., $N_{sb}$) may be given by higher layers.

Hopping mode information 1113a may be used to coordinate uplink resource allocation, and thus may be exchanged amongst base stations A and B 1102a-b. A wireless communication device 104 (e.g., UE) performing physical uplink shared channel (PUSCH) frequency-hopping may use one of two possible physical uplink shared channel (PUSCH) frequency-hopping types based on the hopping information (i.e., type 1 or type 2 as discussed above). The parameter "Hopping-mode" (e.g., that may be provided by higher layers) 1113a may determine if physical uplink shared channel (PUSCH) frequency-hopping is "inter-subframe" or "intra- and inter-subframe."

In summary, the parameters that may be exchanged in order to enable coordination of hopping patterns amongst base stations 1102 may include a starting resource block ($RB_{START}$) 1192a, a resource indication value (RIV) 1194a corresponding to a starting resource block $RB_{START}$ 1192a, a length in terms of contiguously allocated resource blocks ($L_{CRBs} \geq 1$) 1196a, downlink control information (DCI) format 0 (e.g., or a part of it), and a single-bit frequency-hopping (FH) field 1198a in a corresponding physical downlink control channel (PDCCH) with downlink control information (DCI) format 0 1187. In the absence of a physical downlink control channel (PDCCH), one of two pieces of information may be used to enable coordination of hopping patterns. The first piece of information is hopping information 1101a in an initial physical uplink shared channel (PUSCH) for a same transport block that is semi-persistently scheduled. Alternatively, the second piece of information may be used, which is a random access response grant 1103a for a same transport block when the physical uplink shared channel (PUSCH) is initiated by the random access response grant 1103a. Further information that may be used to enable coordination of hopping patterns may include a number of physical uplink shared channel (PUSCH) resource blocks $N_{RB}^{PUSCH}$ 1105a, a pusch-HoppingOffset $N_{RB}^{HO}$ 1107a, an uplink bandwidth configuration $N_{RB}^{UL}$ 1109a, a number of sub-bands $N_{sb}$ 1111a and/or hopping mode information 1113a.

For physical uplink shared channel (PUSCH) hopping type 1, the hopping bit or bits indicated in Table (1) may determine $\tilde{n}_{PRB}(i)$ as defined in Table (2). Table (1) is given below and indicates the number of hopping bits (i.e., denoted $N_{UL\_hop}$) versus system bandwidth.

TABLE 1

| System Bandwidth $N_{RB}^{UL}$ | Number of Hopping Bits for $2^{nd}$ Slot Resource Allocation (RA) ($N_{UL\_hop}$) |
|---|---|
| 6-49 | 1 |
| 50-110 | 2 |

Table (2) is given below and indicates the physical downlink control channel (PDCCH) downlink control information DCI format 0 hopping bit definition.

TABLE 2

| System Bandwidth $N_{RB}^{UL}$ | Number of Hopping Bits | Information in Hopping Bits | $\tilde{n}_{PRB}(i)$ |
|---|---|---|---|
| 6-49 | 1 | 0 | $(\lfloor N_{RB}^{PUSCH}/2 \rfloor + \tilde{n}_{PRB}^{S1}(i)) \bmod N_{RB}^{PUSCH}$ |
|  |  | 1 | Type 2 physical uplink shared channel (PUSCH) hopping |
| 50-110 | 2 | 00 | $(\lfloor N_{RB}^{PUSCH}/4 \rfloor + \tilde{n}_{PRB}^{S1}(i)) \bmod N_{RB}^{PUSCH}$ |
|  |  | 01 | $(-\lfloor N_{RB}^{PUSCH}/4 \rfloor + \tilde{n}_{PRB}^{S1}(i)) \bmod N_{RB}^{PUSCH}$ |
|  |  | 10 | $(\lfloor N_{RB}^{PUSCH}/2 \rfloor + \tilde{n}_{PRB}^{S1}(i)) \bmod N_{RB}^{PUSCH}$ |

TABLE 2-continued

| System Bandwidth $N_{RB}^{UL}$ | Number of Hopping Bits | Information in Hopping Bits | $\tilde{n}_{PRB}(i)$ |
|---|---|---|---|
|  |  | 11 | Type 2 physical uplink shared channel (PUSCH) hopping |

The lowest index physical resource block (PRB) ($n_{PRB}^{S1}$) of the first slot resource allocation (RA) in subframe number i 1117a may be defined as $n_{PRB}^{S1}(i) = \tilde{n}_{PRB}^{S1}(i) + \tilde{N}_{RB}^{HO}/2$, where $n_{PRB}^{S1}(i) = RB_{START}$ and $RB_{START}$ may be obtained from the uplink scheduling grant. The lowest index physical resource block (PRB) ($n_{PRB}(i)$) of the second slot resource allocation (RA) in subframe i may be defined as $n_{PRB}(i) = \tilde{n}_{PRB}(i) + \tilde{N}_{RB}^{HO}/2$. The set of physical resource blocks to be used for physical uplink shared channel (PUSCH) transmission may be the length of contiguously allocated resource blocks (i.e., $L_{CRBs}$) 1196a from physical resource block (PRB) index $n_{PRB}^{S1}$ for the first slot, and from physical resource block (PRB) index $n_{PRB}(i)$ for the second slot, respectively. $L_{CRBs}$ 1196a may be obtained from the uplink scheduling grant as explained above. If the Hopping-mode 1113a is "inter-subframe," the first slot resource allocation (RA) may be applied to even CURRENT_TX_NB 1119a, and the second slot resource allocation (RA) may be applied to odd CURRENT_TX_NB 1119a, where CURRENT_TX_NB 1119a is a variable that indicates the number of transmissions that have taken place for the medium access control (MAC) protocol data unit (PDU) currently in the buffer for each hybrid automatic repeat request (HARQ) process. Hence, in order to inform an adjacent base station B 1102b about type 1 physical uplink shared channel (PUSCH) hopping, the hopping bits 1181 and CURRENT_TX_NB 1119a may be sent, received, and/or exchanged amongst base stations A and B 1102a-b. Hopping bits 1181 may be as defined in Table (1). $\tilde{n}_{PRB}(i)$ may be calculated depending on the number of hopping bits 1181 and the information in the hopping bits as shown in Table (2).

In summary, parameters that may be exchanged to enable type 1 physical uplink shared channel (PUSCH) hopping (e.g., in addition to the common parameters that may be needed for both types of hopping) may be included in type 1 hopping information 1115a. Type 1 hopping information 1115a may include hopping bits 1181, a subframe number (i.e., i) of a serving cell 1117a and CURRENT_TX_NB 1119a, which is the current number of transmissions of the medium access control (MAC) protocol data unit (PDU).

For physical uplink shared channel (PUSCH) hopping type 2, the set of physical resource blocks to be used for transmission in slot $n_s$ may be given by a scheduling grant with a predefined hopping pattern. If the system frame number is not acquired by the wireless communication device (e.g., UE) 104 yet, the wireless communication device 104 may not transmit physical uplink shared channel (PUSCH) with type 2 hopping and $N_{sb} > 1$ for time division duplex (TDD), where $N_{sb}$ is defined as the number of sub-bands. If uplink frequency-hopping with a predefined hopping pattern is enabled, the set of physical resource blocks to be used for transmission in slot $n_s$ may be given by a scheduling grant together with a predefined pattern as illustrated in Equation (3).

$$\tilde{n}_{PRB}(n_s) = \begin{pmatrix} \tilde{n}_{VRB} + f_{hop}(i) \cdot N_{RB}^{sb} + \\ ((N_{RB}^{sb} - 1) - 2(\tilde{n}_{VRB} \bmod N_{RB}^{sb})) \cdot f_m(i) \end{pmatrix} \bmod(N_{RB}^{sb} \cdot N_{sb}) \quad \text{Equation (3)}$$

$$i = \begin{cases} \lfloor n_s/2 \rfloor & \text{inter-subframe hopping} \\ n_s & \text{intra and inter-subframe hopping} \end{cases}$$

$$n_{PRB}(n_s) = \begin{cases} \tilde{n}_{PRB}(n_s) & N_{sb} = 1 \\ \tilde{n}_{PRB}(n_s) + \lceil N_{RB}^{HO}/2 \rceil & N_{sb} > 1 \end{cases}$$

$$\tilde{n}_{VRB} = \begin{cases} n_{VRB} & N_{sb} = 1 \\ n_{VRB} - \lceil N_{RB}^{HO}/2 \rceil & N_{sb} > 1 \end{cases}$$

$n_{VRB}$ may be obtained from the scheduling grant as described above. The hopping function $f_{hop}(i)$ is illustrated in Equation (6) below. The parameter pusch-HoppingOffset (i.e., $N_{RB}^{HO}$) 1107a may be provided by higher layers. The size of each sub-band (i.e., denoted $N_{RB}^{sb}$) may be determined as illustrated in Equation (4).

$$N_{RB}^{sb} = \begin{cases} N_{RB}^{UL} & N_{sb} = 1 \quad \text{Equation (4)} \\ \lfloor (N_{RB}^{UL} - N_{RB}^{HO} - N_{RB}^{HO} \bmod 2)/N_{sb} \rfloor & N_{sb} > 1 \end{cases}$$

The number of sub-bands $N_{sb}$ may be given by higher layers. The function $f_m(i) \in \{0,1\}$ may be used to determine whether mirroring is used or not. This function is illustrated in Equation (5).

$$f_m(i) = \begin{cases} i \bmod 2 & N_{sb} = 1 \text{ and intra and} \quad \text{Equation (5)} \\ & \text{inter-subframe hopping} \\ \text{CURRENT\_TX\_NB} \bmod 2 & N_{sb} = 1 \text{ and} \\ & \text{inter-subframe hopping} \\ c(i \cdot 10) & N_{sb} > 1 \end{cases}$$

CURRENT_TX_NB 1125a may indicate the transmission number for the transport block transmitted in $n_s$. c(i) is a pseudo-random sequence. The parameter Hopping-mode 1113a (e.g., which may be provided by higher layers) may indicate whether hopping is "inter-subframe" or "intra- and inter-subframe." The hopping function $f_{hop}(i)$ is illustrated in Equation (6) (i.e., where $f_{hop}(-1)=0$).

$$f_{hop}(i) = \begin{cases} 0 & N_{sb} = 1 \quad \text{Equation (6)} \\ \left( f_{hop}(i-1) + \sum_{k=i \cdot 10+1}^{i \cdot 10+9} c(k) \times 2^{k-(i \cdot 10+1)} \right) \bmod N_{sb} & N_{sb} = 2 \\ \left( f_{hop}(i-1) + \left( \sum_{k=i \cdot 10+1}^{i \cdot 10+9} c(k) \times 2^{k-(i \cdot 10+1)} \right) \bmod(N_{sb}-1) + 1 \right) \bmod N_{sb} & N_{sb} > 2 \end{cases}$$

Pseudo-random sequences c(i) may be defined by a length-31 Gold sequence. The output sequence c(n) of length $M_{PN}$ (i.e., n=0, 1, ..., $M_{PN}$−1) may be defined as illustrated in Equation (7) (e.g., where PN is an abbreviation for "pseudonoise").

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{Equation (7)}$$

In one configuration, $N_C = 1600$ and the first m-sequence may be initialized with $x_1(0)=1$, $x_1(n)=0$, n=1, 2, ..., 30. The initialization of the second m-sequence may be denoted by $c_{init} = \sum_{i=0}^{30} x_2(i) \cdot 2^i$ with the value depending on the application of the sequence (i.e., where $c_{init} = N_{ID}^{cell}$ and $N_{ID}^{cell}$)[11] indicates a physical layer cell identity).

The pseudo-random sequence generator may be initialized with $c_{init} = N_{ID}^{cell}$ for frequency-division duplexing (FDD) and $c_{init} = 2^9 \cdot (n_f \bmod 4) + N_{ID}^{cell}$ (i.e., where $n_f$ is the system frame number) for time-division duplexing (TDD) at the start of each frame. The slot number may be coordinated amongst base stations 1102. Slot numbers may be exchanged in different ways (e.g., the exact slot number of base station A 1102a may be transmitted to base station B 1102b or some form of slot number offset may be exchanged).

In summary, the parameters that may be exchanged to enable type 2 physical uplink shared channel (PUSCH) hopping may be included in type 2 hopping information 1121a. Type 2 hopping information 1121a may include a subframe number (i) of a serving cell 1123a, a CURRENT_TX_NB 1125a (i.e., the number of transmissions of the medium access control (MAC) protocol data unit (PDU)) and/or $N_{ID}^{cell}$ 1127a (i.e., the identification (ID) of the serving cell to initialize a pseudo-random generator). Additional parameters such as the slot number ($n_s$)) 1183 and the system frame number ($n_f$) 1185 may also be sent, received and/or exchanged amongst base stations 1102. These parameters may be sent in addition to other common parameters that may be needed for both types of hopping as described above.

It should be noted that FIG. 11 illustrates many parameters that may be used to determine physical resource blocks and hopping patterns. In one configuration, base station A 1102a determines the physical resource blocks and sends them to base station B 1102b. In another configuration, base station A 1102a sends parameters that allow base station B 1102b to determine the physical resource blocks. Additionally, base station A 1102a may send either a determined hopping pattern to base station B 1102b or parameters that allow base station B 1102b to determine the hopping pattern.

Figure 12:
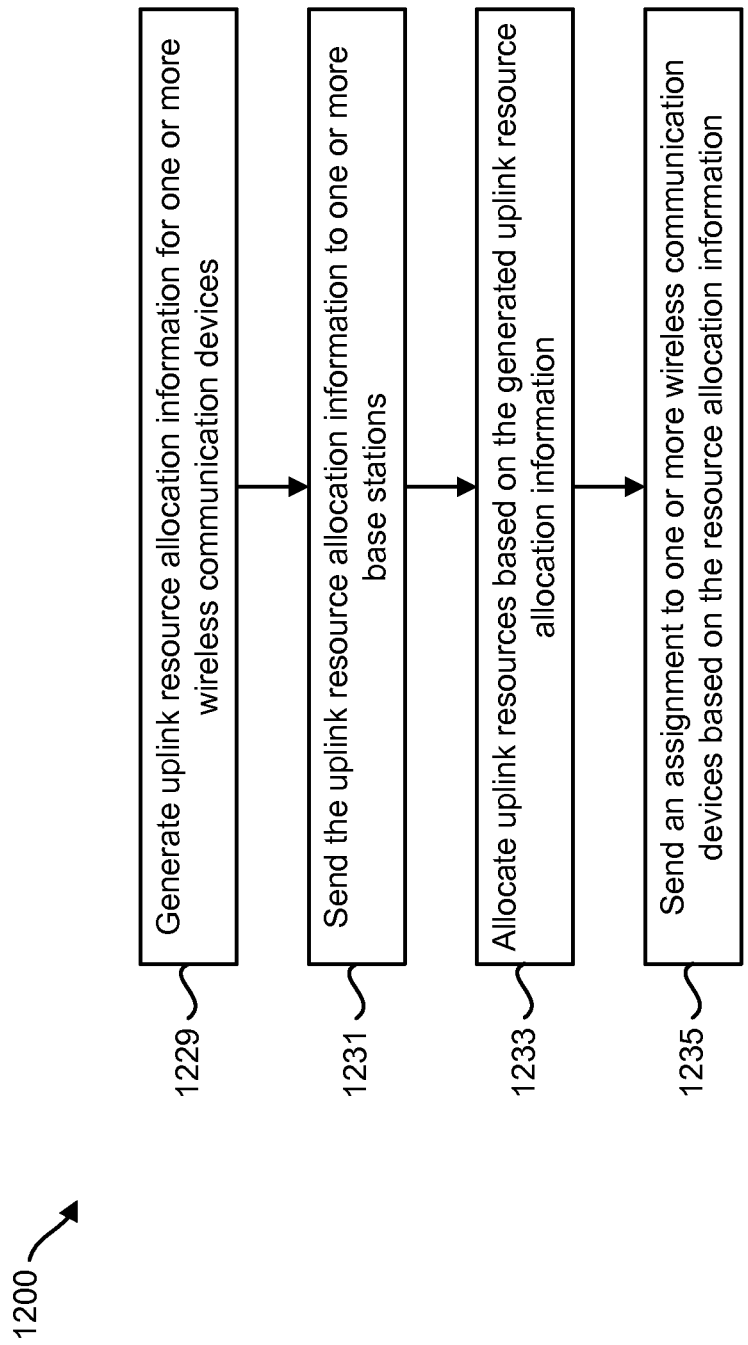
FIG. 12 is a flow diagram illustrating one configuration of a method for coordinating uplink resource allocation.

FIG. 12 is a flow diagram illustrating one configuration of a method 1200 for coordinating uplink resource allocation. A base station 102 may generate 1229 uplink resource allocation information 448 for one or more wireless communication devices 104. The base station 102 may send 1231 the uplink resource allocation information 448 to one or more other base stations 102. For example, a first base station 102 may send 1231 the uplink allocation information 448 to one or more adjacent base stations 102 using a wired or wireless link, as described above in connection with FIG. 4.

The base station 102 may allocate 1233 uplink resources based on the generated uplink resource allocation information 448. For example, the base station 102 may allocate portions of an uplink 414 for one or more wireless communication devices 104. That is, the base station 102 may anticipate data from one or more wireless communication devices 104 arriving in certain frequency bands 316 and/or time slots 320 (e.g., possibly in a hopping pattern) according to the uplink resource allocation information 448. The uplink 414 may be a physical uplink shared channel (PUSCH), for example.

The base station 102 may send 1235 an assignment 446 to one or more wireless communication devices 104 based on the resource allocation information 448. For example, the base station 102 may send an assignment 446 that is based on the resource allocation information 448 to one or more wireless communication devices 104 using a downlink 450. The downlink 450 may be a physical downlink control channel (PDCCH), for example. This may inform a wireless communication device 104 regarding which uplink resources have been allocated 452 for its use.

Figure 13:
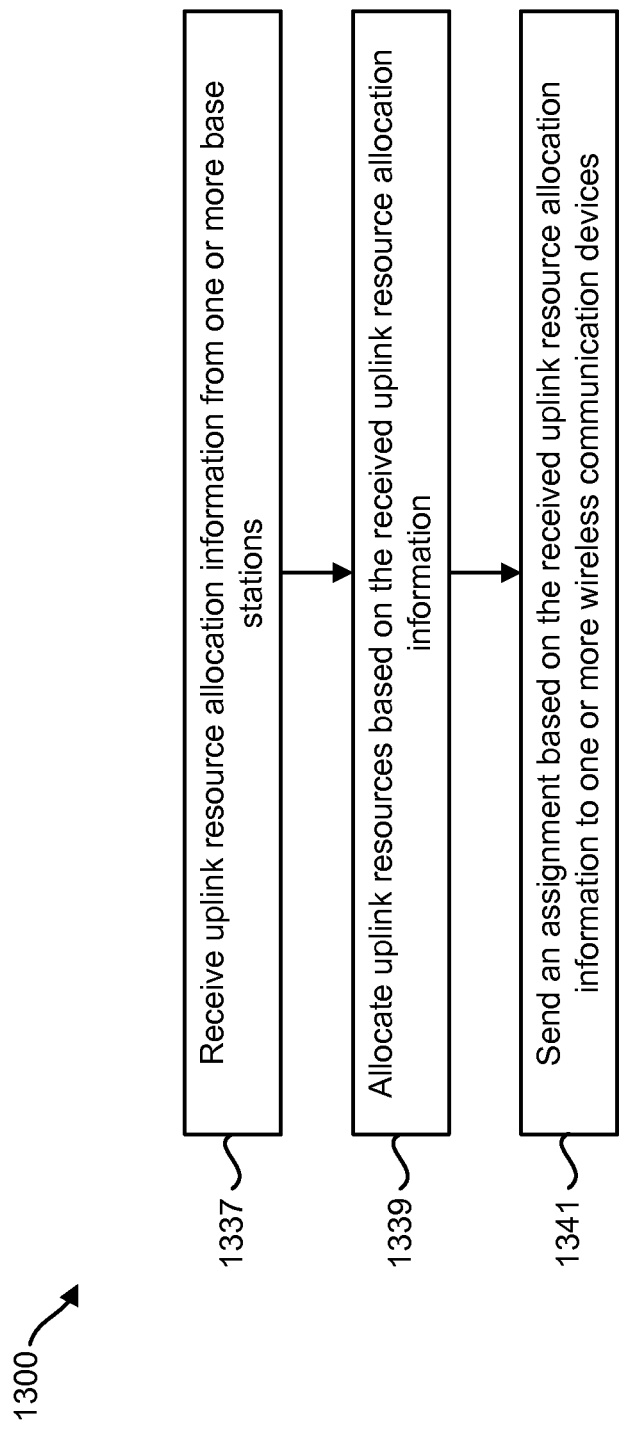
FIG. 13 is a flow diagram illustrating another configuration of a method for coordinating uplink resource allocation.

FIG. 13 is a flow diagram illustrating another configuration of a method 1300 for coordinating uplink resource allocation. A base station 102 may receive 1337 uplink resource allocation information 448 from one or more (e.g., adjacent) base stations 102.

The base station 102 may allocate 1339 uplink 414 resources 452 based on the received uplink resource allocation information 448. For example, a base station 102 may allocate uplink 414 resources 452 in such a way as to avoid interference between a wireless communication device 104 in its cell 106 and another wireless communication device 104 in another cell 106. For example, the base station 102 may allocate 1339 uplink resources (e.g., time slots 320, frequency bands 316) that are different from uplink resources used by a wireless communication device 104 in an adjacent cell 106 that could potentially interfere with a wireless communication device 104 in the base station's 102 serving cell 106. The uplink 414 may be a physical uplink shared channel (PUSCH), for example.

The base station 102 may send 1341 an assignment 446 based on the received uplink resource allocation information 448 to one or more wireless communication devices 104. For example, the base station 102 may send 1341 an assignment 446 to one or more wireless communication devices 104 in its serving cell 106 using a downlink 450 (e.g., physical downlink control channel (PDCCH)). In this manner, potential interference 110 may be reduced or avoided.

It should be noted that the methods 1200, 1300 illustrated in FIGS. 12 and 13 may be performed on separate base stations 102 or on the same base station 102. For example, a single base station 102 may both send 1231 uplink resource allocation information 448 to one or more other base stations 102 and also receive 1337 other uplink resource allocation information 448 from one or more other base stations 102. Furthermore, a single base station 102 may allocate 1339 uplink 414 resources 452 based on the generated 1229 uplink resource allocation information 448 alternatively or in addition to received 1337 uplink resource allocation information 448. One or more assignments 446 may also be generated based on generated 1229 and/or received 1337 uplink resource allocation information 448. The one or more assignments 446 may then be sent 1235, 1341 to one or more wireless communication devices 104 (e.g., in the base station's serving cell 106).

Figure 14:
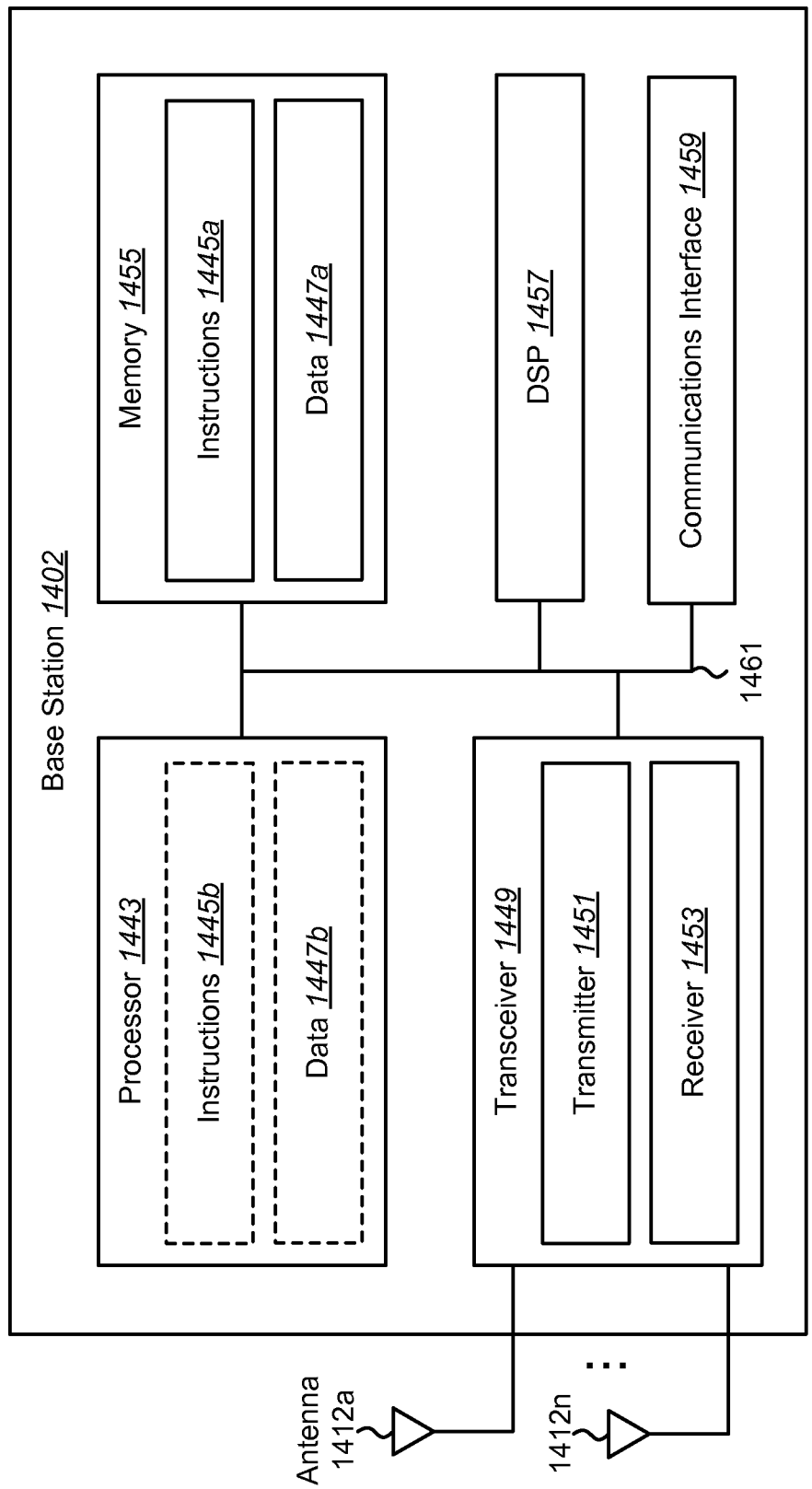
FIG. 14 illustrates various components that may be utilized in a base station.

FIG. 14 illustrates various components that may be utilized in a base station 1402. The base station 1402 may be utilized as the base station 102 in FIG. 1. The base station 1402 includes a processor 1443 that controls operation of the base station 1402. The processor 1443 may also be referred to as a CPU. Memory 1455, which may include both read-only memory (ROM), random access memory (RAM) or any type of device that may store information, provides instructions 1445a and data 1447a to the processor 1443. A portion of the memory 1455 may also include non-volatile random access memory (NVRAM). Instructions 1445b and data 1447b may also reside in the processor 1443. Instructions 1445b loaded into the processor 1443 may also include instructions 1445a from memory 1455 that were loaded for execution by the processor 1443. The instructions 1445b may be executed by the processor 1443 to implement the methods disclosed herein.

The base station 1402 may also include a housing that contains a transmitter 1451 and a receiver 1453 to allow transmission and reception of data. The transmitter 1451 and receiver 1453 may be combined into a transceiver 1449. One or more antenna 1412a-n are attached to the housing and electrically coupled to the transceiver 1449.

The various components of the base station 1402 are coupled together by a bus system 1461 which may include a power bus, a control signal bus, and a status signal bus, in addition to a data bus. However, for the sake of clarity, the various buses are illustrated in FIG. 14 as the bus system 1461. The base station 1402 may also include a digital signal processor (DSP) 1457 for use in processing signals. The base station 1402 may also include a communications interface 1459 that provides user access to the functions of the base station 1402. The base station 1402 illustrated in FIG. 14 is a functional block diagram rather than a listing of specific components.

Figure 15:
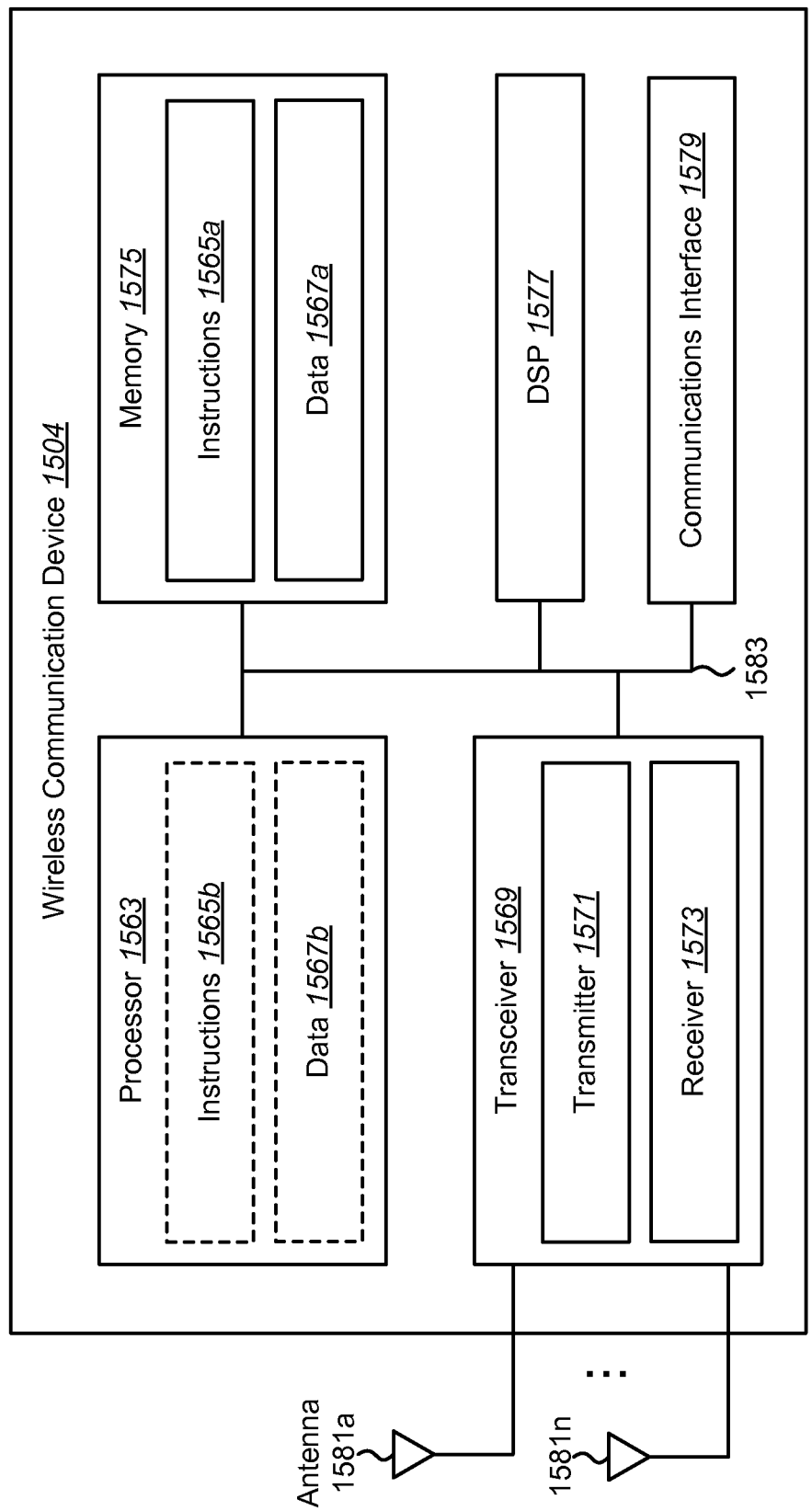
FIG. 15 illustrates various components that may be utilized in a wireless communication device.

FIG. 15 illustrates various components that may be utilized in a wireless communication device 1504. The wireless communication device 1504 may be utilized as the wireless communication device 104 in FIG. 1. The wireless communication device 1504 may include components that are similar to the components discussed above in relation to the base station 1402, including a processor 1563, memory 1575 that provides instructions 1565a and data 1567a to the processor 1563, instructions 1565b and data 1567b that may reside in the processor 1563, a housing that contains a transmitter 1571 and a receiver 1573 (which may be combined into a transceiver 1569), one or more antennas 1581a-n electrically coupled to the transceiver 1569, a bus system 1583, a DSP 1577 for use in processing signals, a communications interface 1579, and so forth.

The term "computer-readable medium" or "processor-readable medium" refers to any available medium that can be accessed by a computer or a processor. The term "computer-readable medium," as used herein, may denote a computer- and/or processor-readable medium. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, a processor-readable medium may similarly comprise RAM, ROM, EEPROM, CD-ROM or other optical disk storage, magnetic disk storage or other magnetic storage devices, or any other medium that can be used to carry or store desired program code in the form of instructions or data structures and that can be accessed by a processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Each of the methods disclosed herein comprises one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A base station configured for coordinating uplink resource allocation, comprising:
    a processor;
    memory in electronic communication with the processor;
    instructions stored in the memory, the instructions being executable to:
        generate uplink resource allocation information for one or more wireless communication devices, wherein the uplink resource allocation information comprises a starting resource block, a length in terms of contiguously allocated resource blocks, a resource indication value, at least a part of downlink control information (DCI), a frequency-hopping field, a number of physical uplink shared channel (PUSCH) resource blocks, a hopping offset, an uplink bandwidth configuration, and a number of sub-bands and hopping mode information;
        send the uplink resource allocation information to one or more base stations;
        allocate uplink resources based on the uplink resource allocation information; and
        send an assignment to one or more wireless communication devices based on the uplink resource allocation information.

2. The base station of claim 1, wherein the instructions are further executable to receive other uplink resource allocation information from another base station.

3. The base station of claim 2, wherein the uplink resources are allocated further based on the other uplink resource allocation information.

4. The base station of claim 1, wherein the uplink resource allocation information is sent to the one or more base stations using a direct wired link.

5. The base station of claim 1, wherein the uplink resource allocation information is sent to the one or more base station using a direct wireless link.

6. The base station of claim 1, wherein the uplink resource allocation information is sent to the one or more base stations using a wireless relay.

7. The base station of claim 1, wherein the uplink resource allocation information is sent to the one or more base stations using a backbone network connection.

8. The base station of claim 1, wherein the uplink resource allocation information is sent to the one or more base stations in order to reduce interference from one or more wireless communication devices.

9. The base station of claim 1, wherein the uplink resource allocation information comprises information that identifies one or more wireless communication devices, uplink time scheduling information and uplink frequency scheduling information.

10. The base station of claim 1, wherein the uplink resource allocation information comprises resource blocks.

11. The base station of claim 10, wherein the resource blocks are mapped using a bitmap mapping.

12. The base station of claim 1, wherein the uplink resource allocation information comprises a predefined hopping pattern.

13. The base station of claim 1, wherein the uplink resource allocation information comprises parameters by which a hopping pattern may be obtained.

14. The base station of claim 1, wherein the uplink resource allocation information comprises parameters by which resource blocks may be obtained.

15. The base station of claim 1, wherein a no frequency hopping restriction is imposed on the one or more wireless communication devices.

16. The base station of claim 1, wherein the uplink resources are allocated to one or more component carriers.

17. The base station of claim 1, wherein the uplink resource allocation information is sent in order to allow a plurality of base stations to decode data sent from a wireless communication device.

18. The base station of claim 1, wherein the uplink resource allocation information comprises hopping information or a random access grant.

19. A base station configured for coordinating uplink resource allocation, comprising:
    a processor;
    memory in electronic communication with the processor;
    instructions stored in the memory, the instructions being executable to:
        generate uplink resource allocation information for one or more wireless communication devices, wherein the uplink resource allocation information comprises a starting resource block, a length in terms of contiguously allocated resource blocks, hopping bits, a sub-frame number and a current number of transmissions of a medium access control (MAC) protocol data unit (PDU);
        send the uplink resource allocation information to one or more base stations;
        allocate uplink resources based on the uplink resource allocation information; and
        send an assignment to one or more wireless communication devices based on the uplink resource allocation information.

20. A base station configured for coordinating uplink resource allocation, comprising:
    a processor;
    memory in electronic communication with the processor;
    instructions stored in the memory, the instructions being executable to:

generate uplink resource allocation information for one or more wireless communication devices, wherein the uplink resource allocation information comprises a starting resource block, a length in terms of contiguously allocated resource blocks, a subframe number, a number of transmissions of a medium access control (MAC) protocol data unit (PDU) an identification of a serving cell, and a slot number and a frame number);

send the uplink resource allocation information to one or more base stations;

allocate uplink resources based on the uplink resource allocation information; and send an assignment to one or more wireless communication devices based on the uplink resource allocation information.

21. A base station configured for coordinating uplink resource allocation, comprising:

a processor;

memory in electronic communication with the processor;

instructions stored in the memory, the instructions being executable to:

receive uplink resource allocation information from one or more base stations, wherein the uplink resource allocation information comprises a starting resource block, a length in terms of contiguously allocated resource blocks, a resource indication value, at least a part of downlink control information (DCI), a frequency-hopping field, a number of physical uplink shared channel (PUSCH) resource blocks, a hopping offset, an uplink bandwidth configuration, and a number of sub-bands and hopping mode information;

allocate uplink resources based on the uplink resource allocation information; and send an assignment based on the received uplink resource allocation information to one or more wireless communication devices.

22. A method for coordinating uplink resource allocation, comprising:

generating, on a base station, uplink resource allocation information for one or more wireless communication devices, wherein the uplink resource allocation information comprises a starting resource block, a length in terms of contiguously allocated resource blocks, a resource indication value, at least a part of downlink control information (DCI), a frequency-hopping field, a number of physical uplink shared channel (PUSCH) resource blocks, a hopping offset, an uplink bandwidth configuration, and a number of sub-bands and hopping mode information;

sending, from the base station, the uplink resource allocation information to one or more base stations;

allocating, on the base station, uplink resources based on the uplink resource allocation information; and sending, from the base station, an assignment to one or more wireless communication devices based on the uplink resource allocation information.

23. The method of claim 22, further comprising receiving other uplink resource allocation information from another base station.

24. The method of claim 23, wherein the uplink resources are allocated further based on the other uplink resource allocation information.

25. The method of claim 22, wherein the uplink resource allocation information is sent to the one or more base stations using a direct wired link.

26. The method of claim 22, wherein the uplink resource allocation information is sent to the one or more base station using a direct wireless link.

27. The method of claim 22, wherein the uplink resource allocation information is sent to the one or more base stations using a wireless relay.

28. The method of claim 22, wherein the uplink resource allocation information is sent to the one or more base stations using a backbone network connection.

29. The method of claim 22, wherein the uplink resource allocation information is sent to the one or more base stations in order to reduce interference from one or more wireless communication devices.

30. The method of claim 22, wherein the uplink resource allocation information comprises information that identifies one or more wireless communication devices, uplink time scheduling information and uplink frequency scheduling information.

31. The method of claim 22, wherein the uplink resource allocation information comprises resource blocks.

32. The method of claim 31, wherein the resource blocks are mapped using a bitmap mapping.

33. The method of claim 22, wherein the uplink resource allocation information comprises a predefined hopping pattern.

34. The method of claim 22, wherein the uplink resource allocation information comprises parameters by which a hopping pattern may be obtained.

35. The method of claim 22, wherein the uplink resource allocation information comprises parameters by which resource blocks may be obtained.

36. The method of claim 22, wherein a no frequency hopping restriction is imposed on the one or more wireless communication devices.

37. The method of claim 22, wherein the uplink resources are allocated to one or more component carriers.

38. The method of claim 22, wherein the uplink resource allocation information is sent in order to allow a plurality of base stations to decode data sent from a wireless communication device.

39. The method of claim 22, wherein the uplink resource allocation information comprises hopping information or a random access grant.

40. A method for coordinating uplink resource allocation, comprising:

generating, on a base station, uplink resource allocation information for one or more wireless communication devices, wherein the uplink resource allocation information comprises a starting resource block, a length in terms of contiguously allocated resource blocks, hopping bits, a subframe number and a current number of transmissions of a medium access control (MAC) protocol data unit (PDU);

sending, from the base station, the uplink resource allocation information to one or more base stations;

allocating, on the base station, uplink resources based on the uplink resource allocation information; and sending, from the base station, an assignment to one or more wireless communication devices based on the uplink resource allocation information.

41. A method for coordinating uplink resource allocation, comprising:

generating, on a base station, uplink resource allocation information for one or more wireless communication devices, wherein the uplink resource allocation information comprises a starting resource block, a length in terms of contiguously allocated resource blocks, a subframe number, a number of transmissions of a medium access control (MAC) protocol data unit (PDU), an identification of a serving cell, a slot number and a frame number;

sending, from the base station, the uplink resource allocation information to one or more base stations;

allocating, on the base station, uplink resources based on the uplink resource allocation information; and sending, from the base station, an assignment to one or more wireless communication devices based on the uplink resource allocation information.

42. A method for coordinating uplink resource allocation, comprising:

receiving uplink resource allocation information from one or more base stations, wherein the uplink resource allocation information comprises a starting resource block, a length in terms of contiguously allocated resource blocks, a resource indication value, at least a part of downlink control information (DCI), a frequency-hopping field, a number of physical uplink shared channel (PUSCH) resource blocks, a hopping offset, an uplink bandwidth configuration, and a number of sub-bands and hopping mode information;

allocating, on a base station, uplink resources based on the uplink resource allocation information; and sending, from the base station, an assignment based on the received uplink resource allocation information to one or more wireless communication devices.

* * * * *